United States Patent
Watanabe et al.

(10) Patent No.: US 10,639,675 B2
(45) Date of Patent: May 5, 2020

(54) ULTRASONIC SENSOR AND CONTROL METHOD THEREFOR

(71) Applicant: Murata Manufacturing Co., Ltd., Nagaokakyo-shi, Kyoto-fu (JP)

(72) Inventors: Kosuke Watanabe, Nagaokakyo (JP); Satoshi Ichihara, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 250 days.

(21) Appl. No.: 15/721,987

(22) Filed: Oct. 2, 2017

(65) Prior Publication Data

US 2018/0021814 A1 Jan. 25, 2018

Related U.S. Application Data

(63) Continuation of application No. PCT/JP2016/052249, filed on Jan. 27, 2016.

(30) Foreign Application Priority Data

Apr. 13, 2015 (JP) .................................. 2015-081810
Sep. 30, 2015 (JP) .................................. 2015-193315

(51) Int. Cl.
*B06B 1/06* (2006.01)
*G01S 7/521* (2006.01)
(Continued)

(52) U.S. Cl.
CPC .............. *B06B 1/06* (2013.01); *B06B 1/0215* (2013.01); *B06B 1/0648* (2013.01); *G01H 11/08* (2013.01);
(Continued)

(58) Field of Classification Search
CPC ....... B06B 1/06; B06B 1/0648; B06B 1/0215; G01H 11/08; G01S 7/524; G01S 15/10; G01S 7/526; H04R 17/00; H04R 3/00
See application file for complete search history.

(56) References Cited

U.S. PATENT DOCUMENTS

| | | | |
|---|---|---|---|
| 2009/0009306 A1 | 1/2009 | Magane et al. | |
| 2009/0168603 A1* | 7/2009 | Okuda | B06B 1/0629 367/87 |

(Continued)

FOREIGN PATENT DOCUMENTS

| | | | |
|---|---|---|---|
| JP | 61-223683 A | 10/1986 | |
| JP | 1-270499 A | 10/1989 | |

(Continued)

OTHER PUBLICATIONS

English Machine Translation of Owada et al. (JP H03-276084), Mar. 27, 1990, translated online Aug. 2019 (Year: 1991).*

(Continued)

*Primary Examiner* — David Z Huang
(74) *Attorney, Agent, or Firm* — Keating & Bennett, LLP

(57) ABSTRACT

An ultrasonic sensor includes a piezoelectric body including a transmission region for an ultrasonic wave and a reception region for a reflected wave of the ultrasonic wave, a common electrode in the transmission region and the reception region, a transmission electrode in the transmission region, a reception electrode in the reception region; and a semiconductor element that is electrically connected to the transmission electrode and the reception electrode and switches an electrical path between a conductive state and a non-conductive state. The semiconductor element puts the path into the conductive state after application of the alternating-current voltage is stopped. Thus, a reverberation signal, output from the reception region in accordance with (Continued)

a reverberant vibration of the ultrasonic wave, is fed back to the transmission electrode.

20 Claims, 23 Drawing Sheets

(51) Int. Cl.
| | | |
|---|---|---|
| *G01S 7/526* | (2006.01) | |
| *G01S 15/10* | (2006.01) | |
| *H04R 17/00* | (2006.01) | |
| *H04R 3/00* | (2006.01) | |
| *G01H 11/08* | (2006.01) | |
| *B06B 1/02* | (2006.01) | |
| *G01S 7/524* | (2006.01) | |

(52) U.S. Cl.
CPC .............. *G01S 7/521* (2013.01); *G01S 7/524* (2013.01); *G01S 7/526* (2013.01); *G01S 15/10* (2013.01); *H04R 3/00* (2013.01); *H04R 17/00* (2013.01)

(56) References Cited

U.S. PATENT DOCUMENTS

| | | | | |
|---|---|---|---|---|
| 2014/0307897 A1* | 10/2014 | Takano | .................. | H04R 19/02 |
| | | | | 381/190 |
| 2016/0069990 A1* | 3/2016 | Harada | ................. | G01S 15/931 |
| | | | | 367/98 |

FOREIGN PATENT DOCUMENTS

| | | |
|---|---|---|
| JP | 3-276084 A | 12/1991 |
| JP | 10-213658 A | 8/1998 |
| JP | 2004-085214 A | 3/2004 |
| JP | 2004-093163 A | 3/2004 |
| JP | 2009-004916 A | 1/2009 |
| JP | 2009-014560 A | 1/2009 |
| JP | 2012-220434 A | 11/2012 |
| WO | 2006/126401 A1 | 11/2006 |

OTHER PUBLICATIONS

English Machine Translation of Sadamura et al. (JP H01-270499 A), Apr. 22, 1988, translated online Aug. 2019 (Year: 1989).*
Official Communication issued in International Patent Application No. PCT/JP2016/052249, dated Apr. 26, 2016.

* cited by examiner

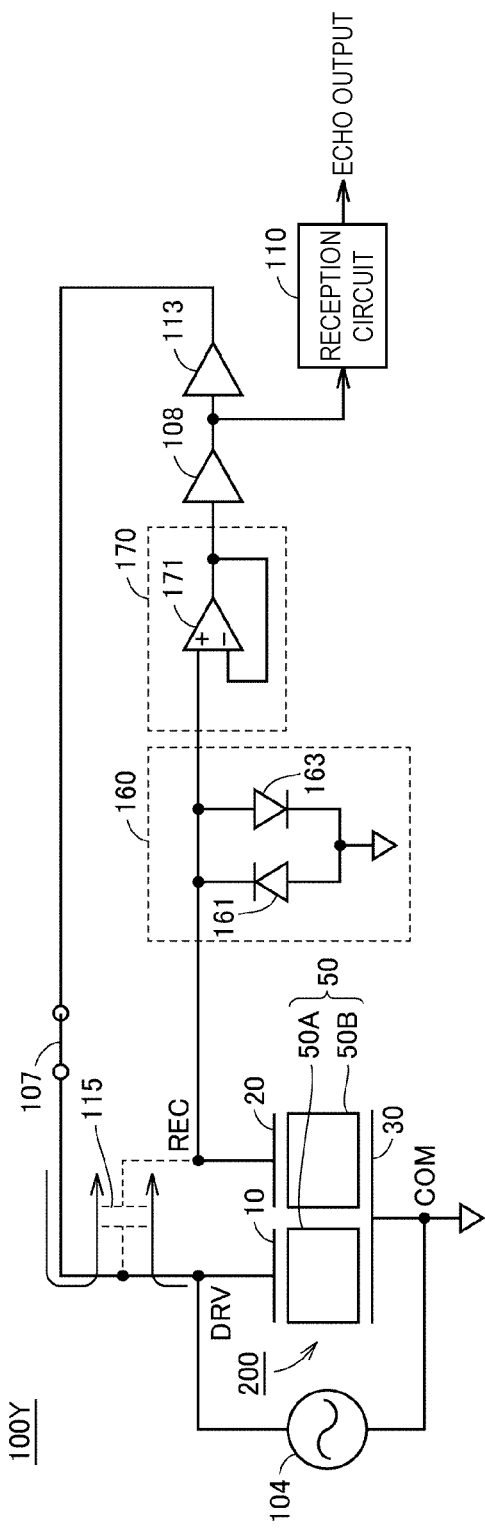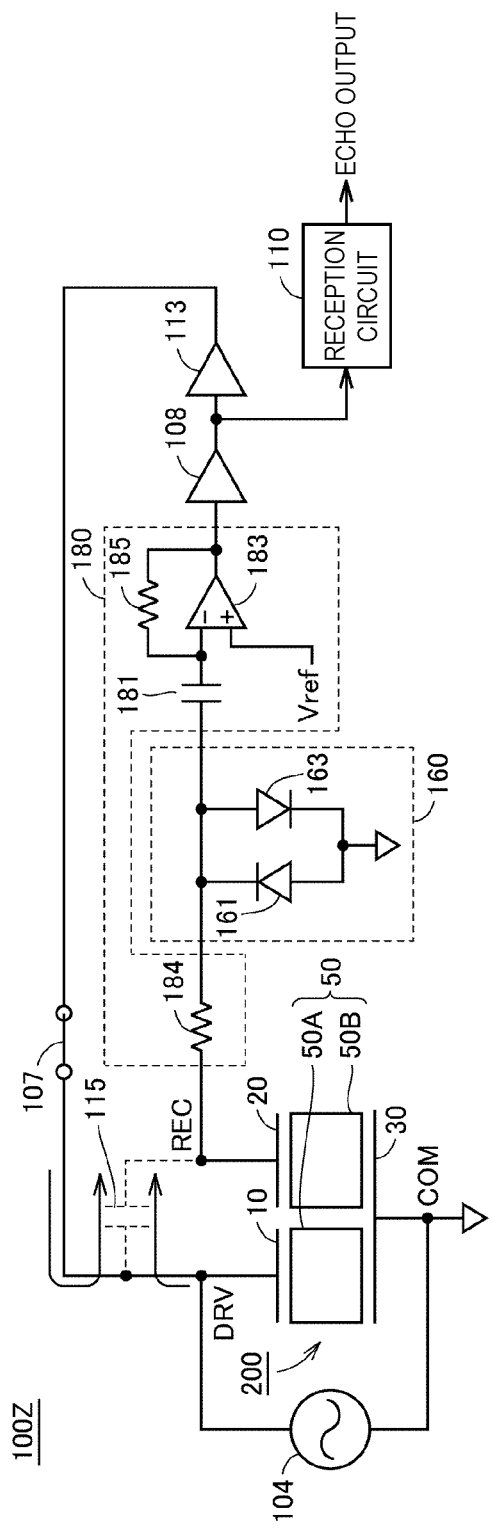
FIG. 20A
FIG. 20B

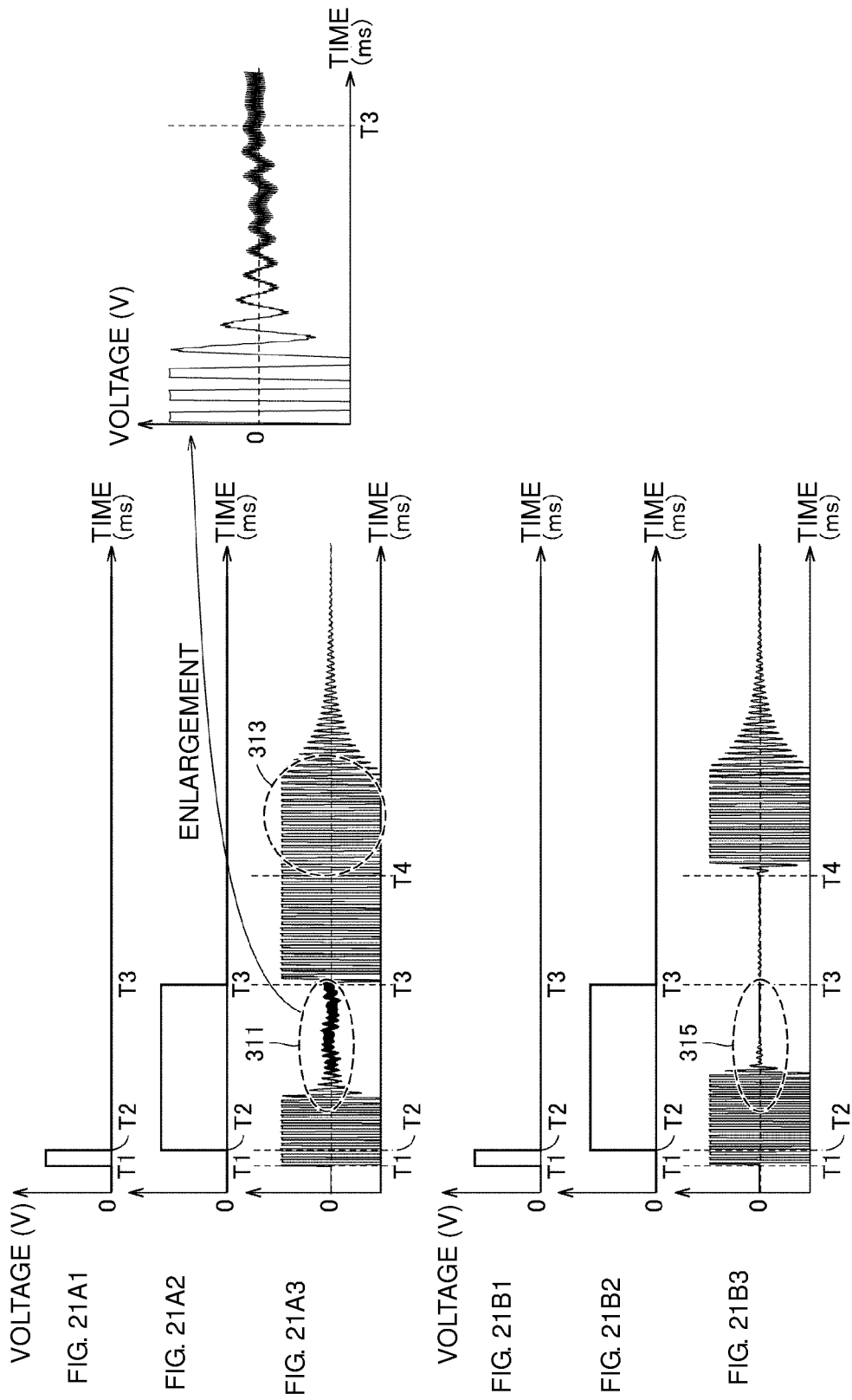

| OPERATION MODE | CONTROL CONDITIONS | | | | | |
|---|---|---|---|---|---|---|
| | DRIVING VOLTAGE | DRIVING FREQUENCY | REVERBERANT VIBRATION SUPPRESSION MODE | REVERBERANT VIBRATION SUPPRESSION TIME | REFLECTED WAVE WAITING TIME | RECEIVED SIGNAL GAIN |
| MODE A | VOLTAGE A | FREQUENCY A | ON | 1ms | 6ms | GAIN A |
| MODE B | VOLTAGE B | FREQUENCY B | ON | 2ms | 7ms | GAIN B |
| MODE C | VOLTAGE C | FREQUENCY C | OFF | — | 40ms | GAIN C |
| ⋮ | ⋮ | ⋮ | ⋮ | ⋮ | ⋮ | ⋮ | ial
ULTRASONIC SENSOR AND CONTROL METHOD THEREFOR

This application claims the benefit of priority to Japanese Patent Application No. 2015-193315 filed on Sep. 30, 2015 and Japanese Patent Application No. 2015-081810 filed on Apr. 13, 2015 and is a Continuation Application of PCT Application No. PCT/JP2016/052249 filed on Jan. 27, 2016. The entire contents of each application are hereby incorporated herein by reference.

BACKGROUND OF THE INVENTION

1. Field of the Invention

The present invention relates to an ultrasonic sensor that includes a piezoelectric element, and more specifically, relates to control of an ultrasonic sensor.

2. Description of the Related Art

Ultrasonic sensors that include piezoelectric elements are known. An ultrasonic sensor causes a piezoelectric element to vibrate by applying an alternating-current voltage to a piezoelectric element, and as a result, transmits an ultrasonic wave. The ultrasonic sensor detects an object on the basis of reception of an ultrasonic wave reflected by the object.

A vibration remains in the ultrasonic sensor after transmission of the ultrasonic wave. The ultrasonic sensor may erroneously detect this vibration (hereafter, also referred to as a "reverberant vibration") as a reflected wave. In recent years, technologies for significantly reducing or preventing reverberant vibrations have been disclosed. For example, Japanese Unexamined Patent Application Publication No. 2009-4916 discloses an ultrasonic wave output device that is capable of significantly reducing or preventing a reverberant vibration.

The ultrasonic wave output device disclosed in Japanese Unexamined Patent Application Publication No. 2009-4916 is formed of a detection part that detects a reverberant vibration and a transmission/reception part that transmits/receives ultrasonic waves. The ultrasonic wave output device generates a signal for significantly reducing or preventing a reverberant vibration in accordance with a reverberant vibration detected by the detection part. After that, the ultrasonic wave output device suppresses the reverberant vibration by feeding the generated signal back to the transmission/reception part. Since the detection part that detects a reverberant vibration is additionally provided in the ultrasonic wave output device, a circuit configuration for feeding the signal for significantly reducing or preventing the reverberant vibration back to the transmission/reception part is required. Consequently, the circuit configuration becomes more complex.

SUMMARY OF THE INVENTION

Preferred embodiments of the present invention provide ultrasonic sensors and control methods for ultrasonic sensors that significantly reduce or prevent a reverberant vibration with a simpler circuit configuration than has been possible to date.

According to a certain aspect of a preferred embodiment of the present invention, an ultrasonic sensor includes a piezoelectric element including a flat-plate-shaped piezoelectric body that includes a transmission region that transmits an ultrasonic wave in response to having an alternating-current voltage applied thereto and a reception region that receives a reflected wave of the ultrasonic wave; a common electrode that is provided in the transmission region and the reception region; a transmission electrode that faces the common electrode with the transmission region interposed therebetween and that is provided in the transmission region; and a reception electrode that faces the common electrode with the reception region interposed therebetween and that is provided in the reception region. The ultrasonic sensor further includes a semiconductor element that is electrically connected to the transmission electrode and the reception electrode and switches an electrical path extending between the transmission electrode and the reception electrode between a conductive state and a non-conductive state. The semiconductor element preferably puts the path into the conductive state after application of the alternating-current voltage is stopped, and as a result a reverberation signal, which is output from the reception region in accordance with a reverberant vibration of the ultrasonic wave, is fed back to the transmission electrode.

The semiconductor element preferably switches the path from the conductive state to the non-conductive state after the reverberation signal has been fed back to the transmission electrode.

The ultrasonic sensor preferably further includes an amplifier that is connected in series with the semiconductor element along the path. The amplifier amplifies the reverberation signal and outputs the amplified reverberation signal to the transmission electrode.

The ultrasonic sensor preferably further includes an I/V conversion circuit that converts a current into a voltage. The I/V conversion circuit is provided along the path.

The I/V conversion circuit preferably filters a signal of a frequency band that causes the ultrasonic sensor to undergo abnormal oscillation.

The I/V conversion circuit preferably includes an operational amplifier and a capacitor. An inverting input terminal of the operational amplifier is electrically connected to the reception electrode. An output terminal of the operational amplifier is electrically connected to the amplifier. The capacitor is electrically connected to the inverting input terminal and the output terminal.

The ultrasonic sensor preferably further includes a reception circuit that is electrically connected to the I/V conversion circuit.

The ultrasonic sensor preferably has a plurality of operation modes having different detection distances from each other. Control conditions of the piezoelectric element are associated in advance with the plurality of operation modes in accordance with the detection distances. The ultrasonic sensor sequentially switches between the plurality of operation modes and controls the piezoelectric element using the control conditions corresponding to a current operation mode.

The ultrasonic sensor preferably has a first operation mode and a second operation mode that has a longer detection distance than the first operation mode. The ultrasonic sensor executes processing to feed the reverberation signal back to the transmission electrode in the first operation mode and does not execute processing to feed the reverberation signal back to the transmission electrode in the second operation mode.

The ultrasonic sensor preferably further includes a step up transformer that is provided along the path.

According to another aspect of a preferred embodiment of the present invention, a control method for an ultrasonic sensor is provided. The ultrasonic sensor includes a piezoelectric element. The piezoelectric element includes a flat-plate-shaped piezoelectric body that includes a transmission region that transmits an ultrasonic wave in response to having an alternating-current voltage applied thereto and a reception region that receives a reflected wave of the ultrasonic wave; a common electrode that is provided in the transmission region and the reception region; a transmission electrode that faces the common electrode with the transmission region interposed therebetween and that is provided in the transmission region; and a reception electrode that faces the common electrode with the reception region interposed therebetween and that is provided in the reception region. The ultrasonic sensor further includes a semiconductor element that is electrically connected to the transmission electrode and the reception electrode and switches an electrical path extending between the transmission electrode and the reception electrode between a conductive state and a non-conductive state. The control method includes a step of putting the path into the non-conductive state; a step of applying an alternating-current voltage to the transmission region after the path has been put into the non-conductive state; and a step of feeding a reverberation signal, which is output from the reception region in accordance with a reverberant vibration of the ultrasonic wave, back to the transmission electrode by putting the path into the conductive state after stopping application of the alternating-current voltage.

According to preferred embodiments of the present invention, ultrasonic sensors and control methods for ultrasonic sensors significantly reduce or prevent a reverberant vibration with a simpler circuit configuration than has been possible to date The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 20A and 20B illustrate examples of the circuit configurations of ultrasonic sensors according to comparative examples.

FIGS. 21A1-21B3 illustrate simulation results obtained in a case where an abnormal oscillation occurs and simulation results obtained in a case where an abnormal oscillation does not occur.

FIG. 27 illustrates the content of control information in the seventh preferred embodiment of the present invention.

DETAILED DESCRIPTION OF THE PREFERRED EMBODIMENTS

Figure 1:
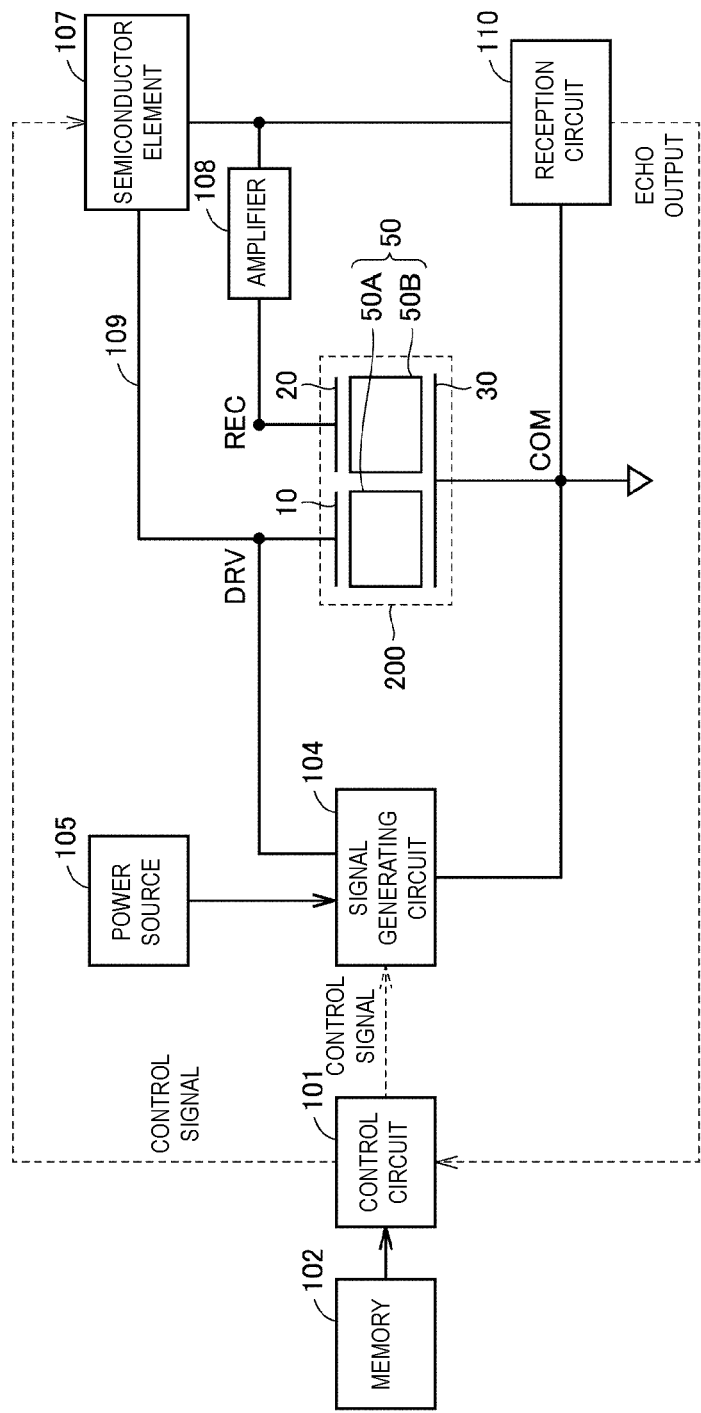
FIG. 1 illustrates an example of the circuit configuration of an ultrasonic sensor according to a first preferred embodiment of the present invention.

Hereafter, preferred embodiments of the present invention will be described while referring to the drawings. In the following description, identical components, elements and features will be denoted by the same symbols. The names and functions of these components, elements and features elements will also be the same. Therefore, detailed description of these components, elements and features will not be repeated. In addition, the preferred embodiments or modifications thereof described hereafter may be appropriately selectively combined with each other.

First Preferred Embodiment

An ultrasonic sensor 100 according to a first preferred embodiment of the present invention will be described while referring to FIG. 1. FIG. 1 illustrates an example of the circuit configuration of the ultrasonic sensor 100.

The ultrasonic sensor 100 may be installed in a vehicle or a smartphone, for example. The ultrasonic sensor 100 measures the distance from itself to an object in accordance with the time from transmitting an ultrasonic wave until receiving a reflected wave. Alternatively, the ultrasonic sensor 100 detects the existence of an object on the basis of reception of a reflected wave.

As illustrated in FIG. 1, the ultrasonic sensor 100 includes a control circuit 101, a memory 102, a signal generating circuit 104, a power source 105, a semiconductor element 107, an amplifier 108, a reception circuit 110 and a piezoelectric element 200.

The control circuit 101 is a microcomputer, for example. The semiconductor element 107 includes a transistor, for example. The control circuit 101 switches an electrical path 109, which extends between a transmission electrode 10 and a reception electrode 20, between a conductive state and a non-conductive state by driving the semiconductor element 107. Furthermore, the control circuit 101 reads out data stored in the memory 102 and outputs an appropriate control signal to drive the ultrasonic sensor 100 to the signal generating circuit 104. The power source 105 outputs a direct-current voltage of 12 V, for example, to the signal generating circuit 104. The signal generating circuit 104 generates an alternating-current voltage from the direct-current voltage on the basis of the control signal output from the control circuit 101. The alternating-current voltage is supplied to the piezoelectric element 200 after being boosted by an amplification circuit (not illustrated) as required.

The piezoelectric element 200 includes the transmission electrode 10, the reception electrode 20, a common electrode 30 and a piezoelectric body 50. The piezoelectric element 200 has the shape of a flat plate, for example. The transmission electrode 10 is provided with a terminal DRV. The reception electrode 20 is provided with a terminal REC. The common electrode 30 is provided with a terminal COM. The piezoelectric element 200 preferably has a three terminal structure made up of the terminal DRV, the terminal REC and the terminal COM. The terminal COM is grounded, but does not necessarily have to be grounded.

The piezoelectric body 50 includes a transmission region 50A to transmit an ultrasonic wave, and a reception region 50B to receive a reflected wave of the ultrasonic wave. The transmission electrode 10 faces the common electrode 30 with the transmission region 50A interposed therebetween and is electrically connected to the transmission region 50A. The reception electrode 20 faces the common electrode 30 with the reception region 50B interposed therebetween and is electrically connected to the reception region 50B. The common electrode 30 is electrically connected to the transmission region 50A and the reception region 50B.

The amplifier 108 is connected in series with the reception electrode 20 and the semiconductor element 107. As an example, the amplifier 108 is an inverter amplification circuit including a resistor and an operational amplifier.

The reception circuit 110 detects a received wave signal, which is generated in the reception region 50B in response to reception of a reflected wave, as a voltage value and outputs the voltage value to the control circuit 101.

Although the ultrasonic sensor 100 with a three terminal structure is illustrated in FIG. 1, the ultrasonic sensor 100 may instead have a structure including four or more terminals. In this case, for example, a configuration may be adopted in which an electrode, which is a different electrode from the transmission electrode 10 and the reception electrode 20, faces the common electrode 30 with the piezoelectric body 50 interposed therebetween. This electrode is electrically connected to the piezoelectric body 50.

Figure 2A:
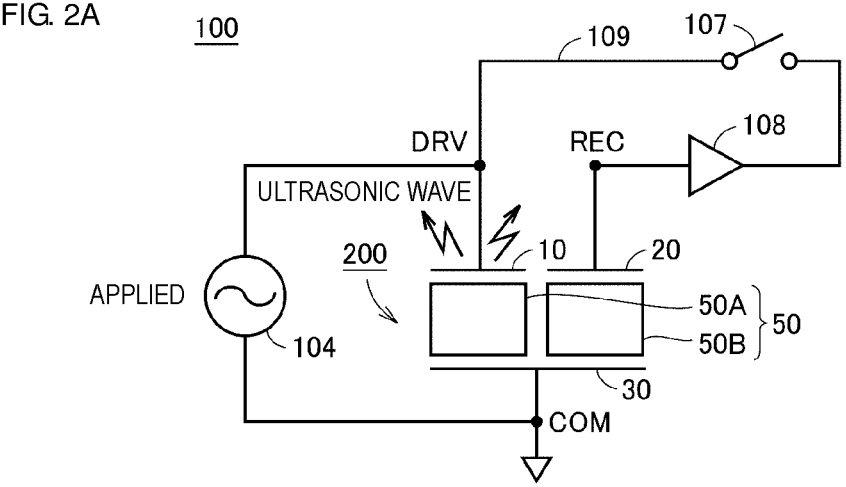
FIGS. 2A-2C are conceptual diagrams that schematically illustrate an example of operation of the ultrasonic sensor according to the first preferred embodiment of the present invention.
Figure 2B:
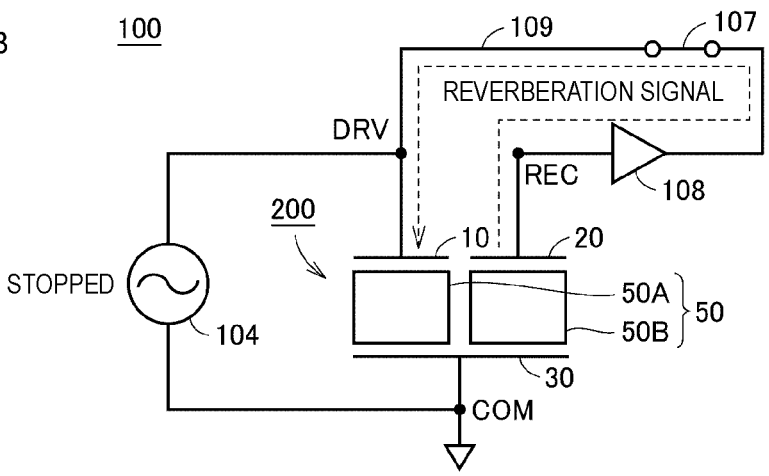
Figure 2C:
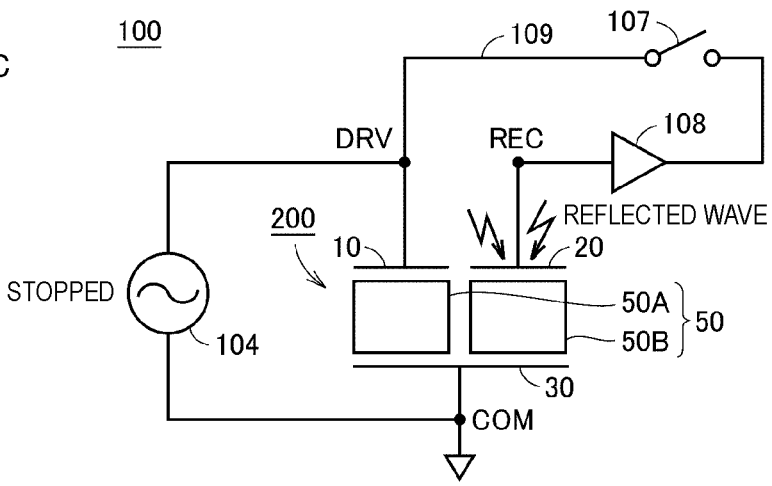

Operation of the ultrasonic sensor 100 according to this preferred embodiment will be described while referring to FIGS. 2A-2C. FIGS. 2A-2C are conceptual diagrams schematically illustrating an example of operation of the ultrasonic sensor 100. To facilitate easy understanding of the description, the control circuit 101, the memory 102, the power source 105 and the reception circuit 110 illustrated in FIG. 1 are not illustrated in FIGS. 2A-2C.

As illustrated in FIGS. 2A-2C, the ultrasonic sensor 100 according to this preferred embodiment sequentially executes step A of transmitting an ultrasonic wave, step B of significantly reducing or preventing a reverberant vibration generated by transmission of the ultrasonic wave, and step C of receiving a reflected wave of the ultrasonic wave. Hereafter, each of these steps A-C will be described in turn.

In step A, the control circuit 101 puts the path 109 into the non-conductive state by driving the semiconductor element 107. Next, the control circuit 101 outputs a control command to the signal generating circuit 104, and as a result, the signal generating circuit 104 applies an alternating-current voltage to the transmission region 50A of the piezoelectric element 200. The period of the alternating-current voltage is preferably equal or substantially equal to the resonant frequency of the transmission region 50A of the piezoelectric element 200. As a result of the alternating-current voltage being applied to the transmission region 50A, the transmission region 50A starts to vibrate due to the inverse piezoelectric effect and transmits an ultrasonic wave into the air, for example.

In step B, the control circuit 101 stops application of the alternating-current voltage to the transmission region 50A once a predetermined period of time (for example, several microseconds to several milliseconds) has elapsed since transmission of the ultrasonic waves started. At this time, the vibration of the transmission region 50A does not immediately subside. In other words, the transmission region 50A continues to vibrate for a while after application of the alternating-current voltage has stopped. This vibration (i.e., a reverberant vibration) affects the reception region 50B and the reception region 50B resonates with the transmission region 50A.

The control circuit 101 switches the path 109 from the non-conductive state to the conductive state after stopping application of the alternating-current voltage. Thus, a closed circuit is provided to include the transmission electrode 10, the transmission region 50A, the common electrode 30, the reception region 50B, the reception electrode 20 and the path 109 in this order. As described above, the transmission region 50A and the reception region 50B vibrate due to the reverberant vibration. The reverberant vibration of the transmission region 50A and the reception region 50B is significantly reduced or prevented by supplying a signal of an appropriate phase so as to cancel out the reverberant vibration. For example, in this preferred embodiment, the reverberant vibration is significantly reduced or prevented in a short period of time by feeding back to the transmission terminal a voltage whose phase is shifted by 180° with respect to the vibration velocity of the reverberant vibration propagating along the path 109. In other words, the reverberant vibration of the piezoelectric element 200 is significantly reduced or prevented by feeding back, as a voltage, to the transmission electrode 10 a reverberation signal output from the reception region 50B in accordance with the reverberant vibration.

The amplifier 108 preferably amplifies the reverberation signal output from the reception region 50B and outputs the amplified reverberation signal to the transmission electrode 10. The amplification ratio of the reverberation signal may be determined in advance at the design stage or may be changed in accordance with the magnitude of the alternating-current voltage applied to the transmission region 50A.

In step C, the control circuit 101 switches the path 109 from the conductive state to the non-conductive state after the reverberation signal has been fed back to the transmission electrode 10. Thus, the reception region 50B is able to receive an ultrasonic wave reflected by an object. As a result, the ultrasonic sensor 100 accurately detects a reflected wave. The reception region 50B vibrates as a result of receiving the ultrasonic wave and outputs a signal generated by the piezoelectric effect to the control circuit 101 as a voltage value.

Figure 3:
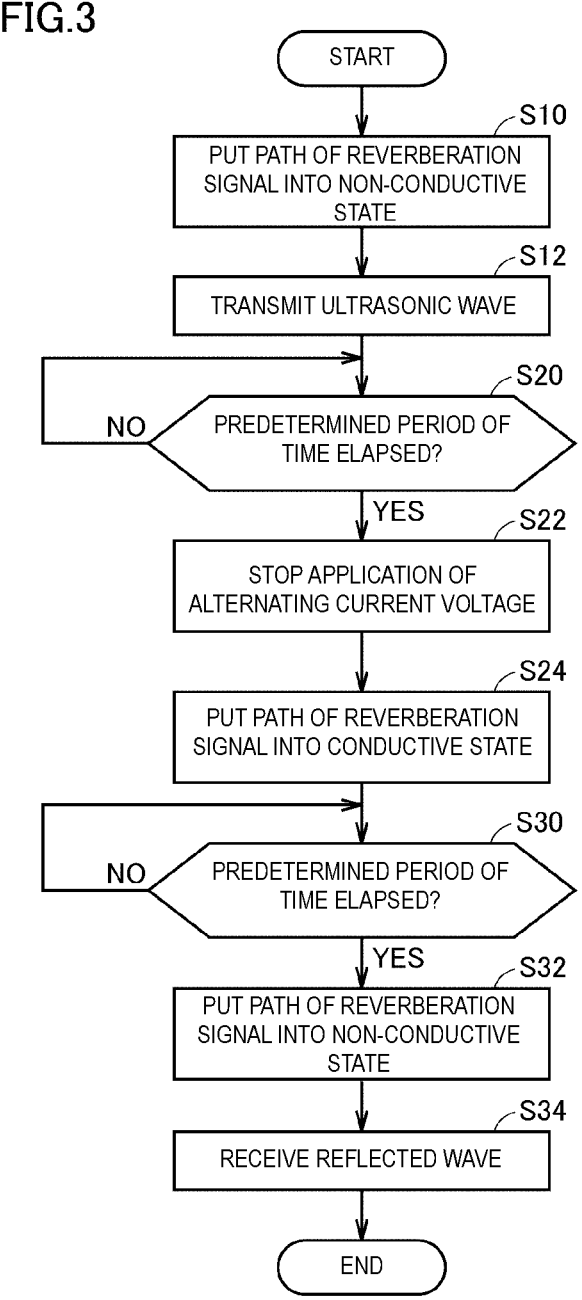
FIG. 3 is a flowchart that depicts processing executed by the ultrasonic sensor according to the first preferred embodiment of the present invention.

A control structure of the ultrasonic sensor 100 will be described while referring to FIG. 3. FIG. 3 is a flowchart depicting processing performed by the ultrasonic sensor 100. The processing in FIG. 3 is preferably realized by a program being executed by the control circuit 101 (refer to FIG. 1) of the ultrasonic sensor 100. In another aspect of a preferred embodiment of the present invention, some or all of the processing may be executed by a central processing unit (CPU) or other hardware such as circuitry or IC circuit(s).

In step S10, the control circuit 101 puts the path 109 (refer to FIG. 2) into the non-conductive state by driving the semiconductor element 107 (refer to FIG. 2).

In step S12, the control circuit 101 applies an alternating-current voltage to the transmission region 50A of the piezoelectric element 200 and causes an ultrasonic wave to be transmitted from the transmission region 50A.

In step S20, the control circuit 101 determines whether a predetermined period of time (for example, several microseconds to several milliseconds) has elapsed since the alternating-current voltage was applied to the transmission region 50A. In the case where the control circuit 101 determines that the predetermined period of time has elapsed since the alternating-current voltage was applied to the transmission region 50A (YES in step S20), the control circuit 101 switches the control to step S22. In the case where the determination is negative (NO in step S20), the control circuit 101 re-executes the processing of step S20.

In step S22, the control circuit 101 stops application of the alternating-current voltage to the transmission region 50A.

In step S24, the control circuit 101 switches the path 109 from the non-conductive state to the conductive state by driving the semiconductor element 107. Thus, the reverberation signal output in accordance with the reverberant vibration is fed back to the transmission electrode from the reception region. As a result, the reverberant vibration of the ultrasonic sensor 100 is significantly reduced or prevented.

In step S30, the control circuit 101 determines whether a predetermined period of time (for example, several microseconds to several milliseconds) has elapsed since the path 109 was put into the conductive state. In the case where the control circuit 101 determines that the predetermined period of time has elapsed since the path 109 was put into the conductive state (YES in step S30), the control circuit 101 switches the control to step S32. In the case where the determination is negative (NO in step S30), the control circuit 101 re-executes the processing of step S30.

In step S32, the control circuit 101 switches the path 109 from the conductive state to the non-conductive state by driving the semiconductor element 107.

In step S34, the control circuit 101 receives a reflected wave of the transmitted ultrasonic wave and outputs the reflected wave to the reception circuit 110 (refer to FIG. 1) as a voltage value.

Figure 4A:
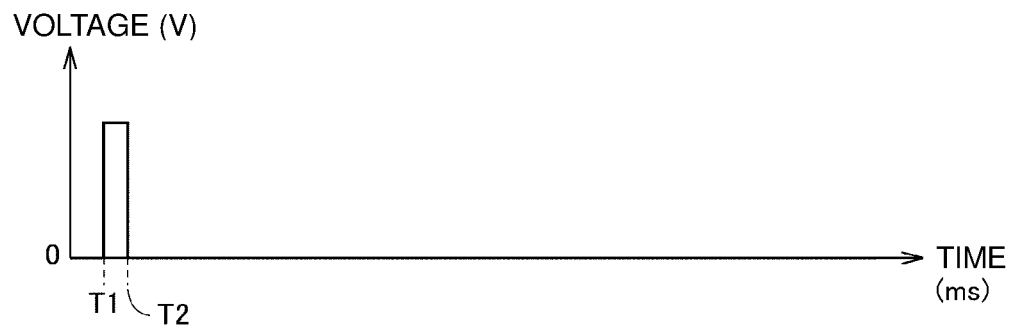
FIGS. 4A-4C illustrate signals in the case where the ultrasonic sensor according to the first preferred embodiment of the present invention does not significantly reduce or prevent a reverberant vibration.
Figure 4B:
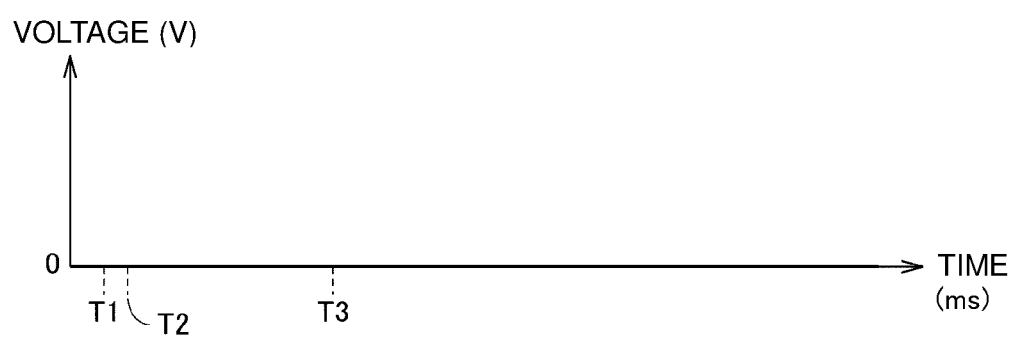
Figure 4C:
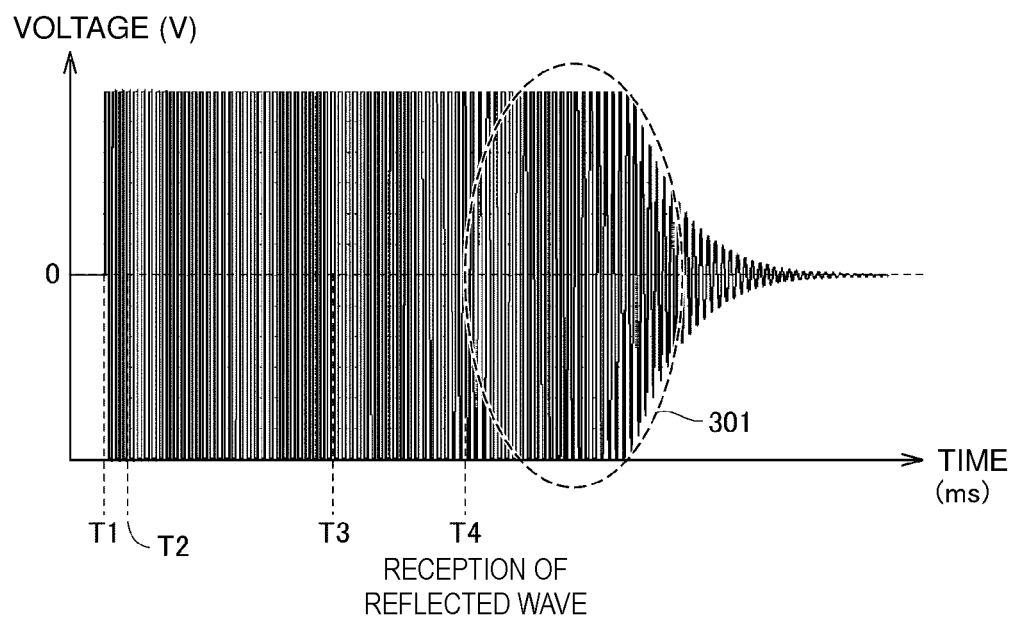
Figure 5A:
FIGS. 5A-5C illustrate signals in the case where the ultrasonic sensor according to the first preferred embodiment of the present invention does significantly reduce or prevent a reverberant vibration.
Figure 5B:
Figure 5C:
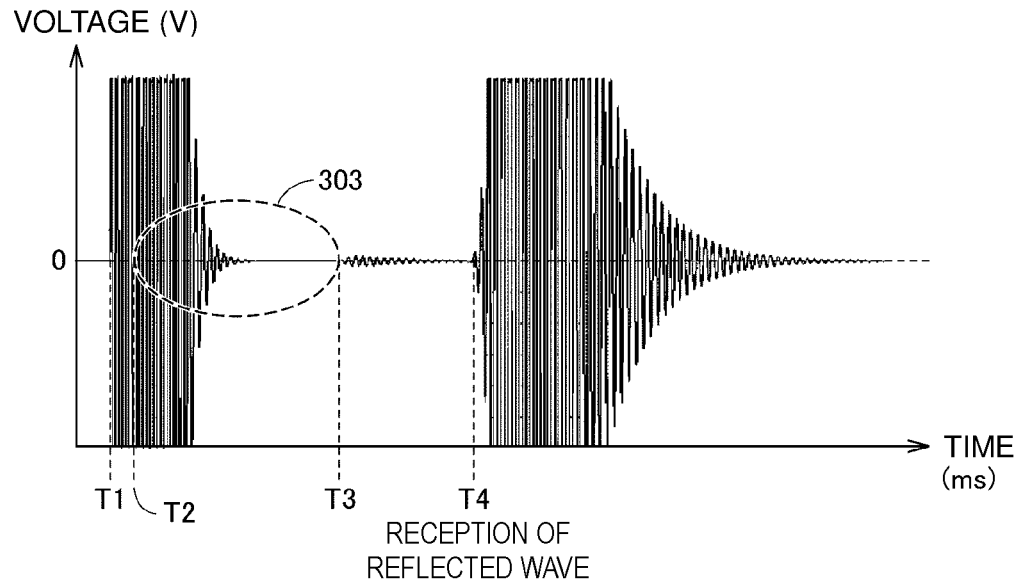

The output of the ultrasonic sensor 100 in the case where the reverberant vibration is significantly reduced or prevented and the output of the ultrasonic sensor 100 in the case where the reverberant vibration is not significantly reduced or prevented will be compared while referring to FIGS. 4A-4C and 5A-5C. FIGS. 4A-4C illustrate the output waveform of the ultrasonic sensor 100 in the case where the reverberant vibration is not significantly reduced or prevented. FIGS. 5A-5C illustrate the output waveform of the ultrasonic sensor 100 in the case where the reverberant vibration is significantly reduced or prevented.

FIG. 4A illustrates a control signal output from the control circuit 101 (refer to FIG. 1) to the signal generating circuit 104 (refer to FIG. 1). Upon receiving the control signal, the signal generating circuit 104 applies an alternating-current voltage to the transmission region 50A (refer to FIG. 1) of the piezoelectric element 200.

More specifically, the control circuit 101 outputs the control signal to the signal generating circuit 104 (refer to FIG. 1) in a period from a time T1 to a time T2. As a result, the signal generating circuit 104 applies an alternating-current voltage to the transmission region 50A. From the time T2, the control circuit 101 stops outputting the control signal to the signal generating circuit 104. As a result, the signal generating circuit 104 stops applying the alternating-current voltage to the transmission region 50A of the piezoelectric element 200.

FIG. 4B illustrates a control signal output from the control circuit 101 to the semiconductor element 107 (refer to FIG. 1). As illustrated in FIG. 4B, the control circuit 101 does not output the control signal to the semiconductor element 107 in the period from the start of control until the finish of control. In other words, the path 109 (refer to FIG. 1) of the reverberation signal is maintained in a non-conductive state and the reverberation signal is not fed back to the transmission region 50A.

FIG. 4C illustrates the output waveform of the ultrasonic sensor 100. In the control example of FIGS. 4A-4C, the reverberation signal is not fed back and therefore the piezoelectric element 200 vibrates even after the time T2 at which application of the alternating-current voltage is stopped. A reflected wave received at a time T4 is buried in the reverberant vibration (refer to dotted line 301). Therefore, the ultrasonic sensor 100 cannot detect the reflected wave.

FIG. 5A illustrates a control signal output from the control circuit 101 to the signal generating circuit 104. FIG. 5A is the same as FIG. 4A and therefore description thereof will not be repeated.

FIG. 5B illustrates a control signal output from the control circuit 101 to the semiconductor element 107. More specifically, the control circuit 101 puts the path 109 in a non-conductive state after starting control until the time T2. The control circuit 101 puts the path 109 into the conductive state in the period from the time T2 until a time T3 by driving the semiconductor element 107. In other words, the ultrasonic sensor 100 feeds the reverberation signal output from the reception region 50B back to the transmission region 50A. The control circuit 101 puts the path 109 into the non-conductive state from the time T3 onwards.

FIG. 5C illustrates the output waveform of the ultrasonic sensor 100 in the case where the reverberant vibration is significantly reduced or prevented. The reverberation signal is fed back to the transmission region 50A in the period from the time T2 until the time T3, and as a result, the reverberant vibration is significantly reduced or prevented (refer to dotted line 303). Thus, the ultrasonic sensor 100 detects the reflected wave received at the time T4.

By significantly reducing or preventing the reverberant vibration in this way, the ultrasonic sensor 100 detects the reflected wave without waiting for the reverberant vibration to naturally subside. Therefore, the ultrasonic sensor 100 detects closer objects than was previously possible and improves the accuracy with which objects are detected and the accuracy with which distances are measured.

Figure 6:
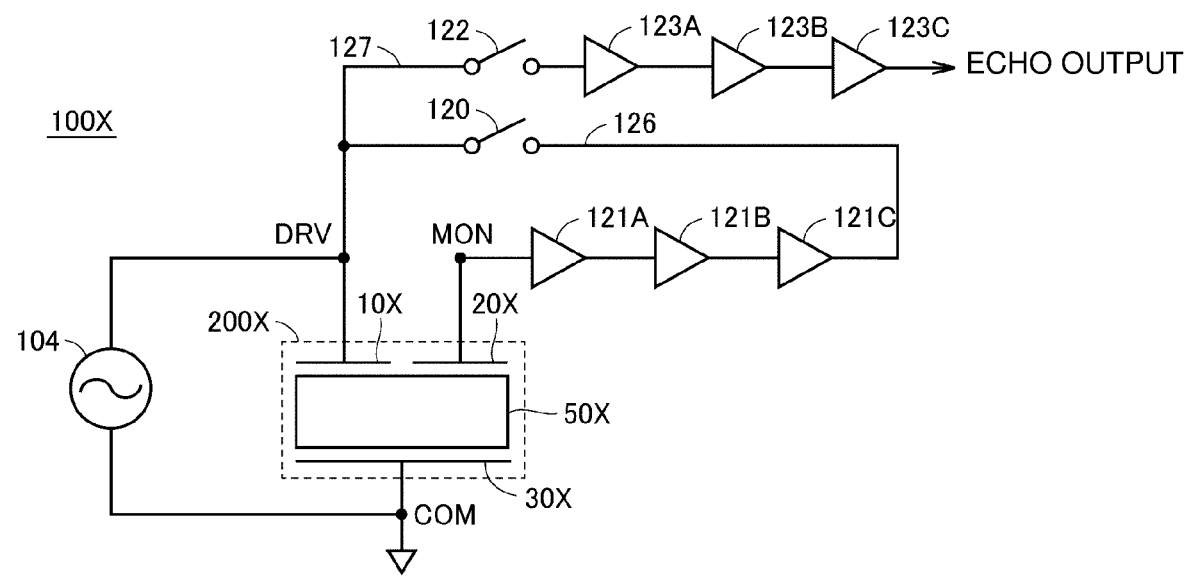
FIG. 6 illustrates an example of the circuit configuration of an ultrasonic sensor according to a comparative example.

The ultrasonic sensor 100 according to the first preferred embodiment and an ultrasonic sensor 100X according to a comparative example will be compared while referring to FIG. 6. FIG. 6 illustrates an example of the circuit configuration of the ultrasonic sensor 100X according to the comparative example.

First, the circuit configuration of the ultrasonic sensor 100X according to the comparative example will be described. As illustrated in FIG. 6, the ultrasonic sensor 100X includes a signal generating circuit 104, semiconductor elements 120 and 122, amplifiers 121A to 121C and 123A to 123C and a piezoelectric element 200X.

The piezoelectric element 200X includes a transmission/reception electrode 10X, a monitoring electrode 20X, a common electrode 30X and a piezoelectric body 50X. The transmission/reception electrode 10X is provided with a terminal DRV. The monitoring electrode 20X is provided with a terminal MON. The common electrode 30X is provided with a terminal COM.

The signal generating circuit 104 is connected to the terminal DRV and the terminal COM. The amplifiers 121A to 121C are connected in series between the terminal MON and the semiconductor element 120. The semiconductor element 120 is connected between the amplifier 121C and the terminal DRV. The semiconductor element 122 is connected to the terminal DRV and is connected in parallel with the semiconductor element 120. The amplifiers 123A to 123C are connected in series with the semiconductor element 122.

Next, operation of the ultrasonic sensor 100X according to the comparative example will be described while referring to FIG. 6. At the time of transmission of an ultrasonic wave, the ultrasonic sensor 100X outputs a control signal to the signal generating circuit 104 and as a result an alternating-current voltage is applied between the terminal DRV and the terminal COM. At this time, the ultrasonic sensor 100X puts a path 126 into a non-conductive state by driving the semiconductor element 120 and puts a path 127 into a non-conductive state by driving the semiconductor element 122.

Next, the ultrasonic sensor 100X stops application of the alternating-current voltage and switches the path 126 from the non-conductive state to a conductive state. Thus, a reverberation signal, which corresponds to a reverberant vibration of the piezoelectric element 200X is amplified by the amplifiers 121A to 121C and then fed back to the transmission/reception electrode 10X. As a result, the reverberant vibration is significantly reduced or prevented.

Next, the ultrasonic sensor 100X switches the path 126 from the conductive state to the non-conductive state and switches the path 127 from the non-conductive state to the conductive state. Upon receiving a reflected wave of the ultrasonic wave, the ultrasonic sensor 100X amplifies a signal generated in accordance with the reflected wave with the amplifiers 123A to 123C and then outputs the amplified signal to a reception circuit.

As described above, in the ultrasonic sensor 100X according to the comparative example, the monitoring electrode 20X, which detects the reverberant vibration, is provided separately from the transmission/reception electrode 10X, which transmits and receives an ultrasonic wave. Consequently, both a circuit to feed back the reverberation signal and a circuit to receive the reflected wave are necessary. More specifically, the semiconductor element 120, the amplifiers 121A to 121C and so forth are necessary as the circuit configuration to feed back the reverberation signal. The semiconductor element 122, the amplifiers 123A to 123C and so forth are necessary as the circuit configuration to receive the reflected wave. In other words, the ultrasonic sensor 100X needs two semiconductor elements 120 and 122 and six amplifiers 121A to 121C and 123A to 123C.

In contrast, in the ultrasonic sensor 100 according to the first preferred embodiment, an electrode that detects the reverberant vibration and an electrode that receives the ultrasonic wave are provided as a single reception electrode 20. Therefore, the ultrasonic sensor 100 utilizes the same circuit elements in the step of detecting the reverberant vibration and in the step of receiving a reflected wave. More specifically, the ultrasonic sensor 100 realizes both detection of the reverberant vibration and reception of the reflected wave with the same semiconductor element 107 and the same amplifier 108. Similarly, an ultrasonic sensor 100C according to a fourth preferred embodiment, which will be described later, realizes both detection of the reverberant vibration and reception of the reflected wave with the same semiconductor element 107 and the same amplifier (amplifier 108, operational amplifier 141 and buffer circuit 113).

Thus, the ultrasonic sensor 100 significantly reduces or prevents the reverberant vibration with a simpler circuit configuration than the ultrasonic sensor 100X. The ultrasonic sensor 100 is reduced in size as a result of the circuit configuration of the ultrasonic sensor 100 being simpler.

Another advantage of the ultrasonic sensor 100 according to the first preferred embodiment will be described while referring to FIGS. 7A-7D and 8A-8C. FIGS. 7A-7D illustrate noise signals generated by switching of semiconductor elements. FIGS. 8A-8C illustrate an output waveform of the ultrasonic sensor 100X (refer to FIG. 6) according to the comparative example.

As described in FIG. 6, the ultrasonic sensor 100X puts the path 126 into the conductive state by driving the semiconductor element 120 and puts the path 127 into the non-conductive state by driving the semiconductor element 122 when significantly reducing or preventing the reverberant vibration. The ultrasonic sensor 100X puts the path 126 into the non-conductive state by driving the semiconductor element 120 and puts the path 127 into the conductive state by driving the semiconductor element 122 when receiving the reflected wave.

Noise signals are generated due to the switching of the semiconductor elements 120 and 122. These noise signals are caused by the circuit being connected to different potentials, clock feed through of the semiconductor elements, charge injection of the semiconductor elements and so forth. The source of the noise signals will be described in more detail while referring to FIGS. 7A-7D.

Figure 7A:
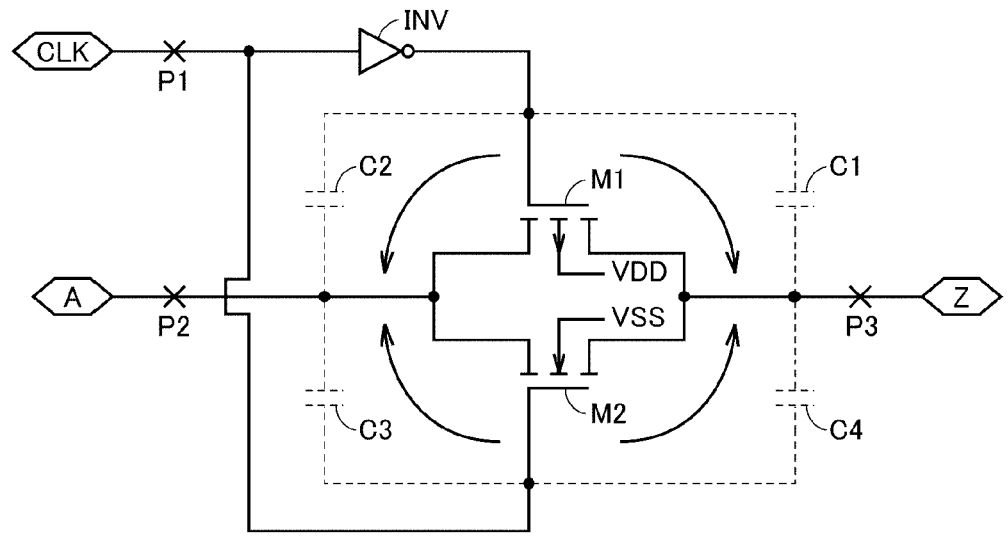
FIGS. 7A-7D illustrate noise signals generated by switching of semiconductor elements.
Figure 8A:
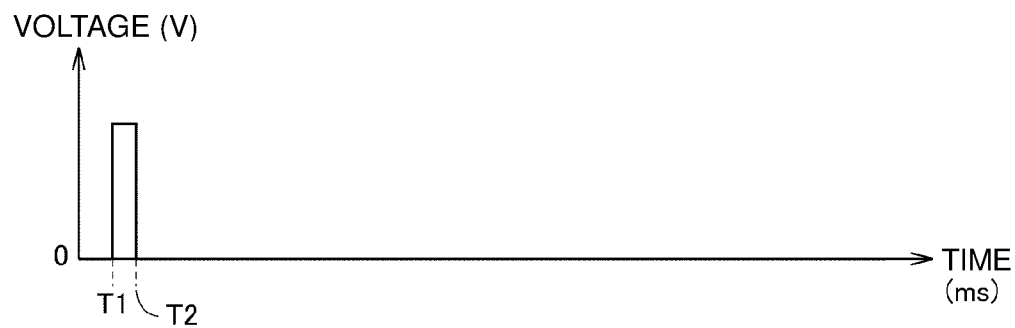
FIGS. 8A-8C illustrate signals of the ultrasonic sensor according to the comparative example.
Figure 8B:
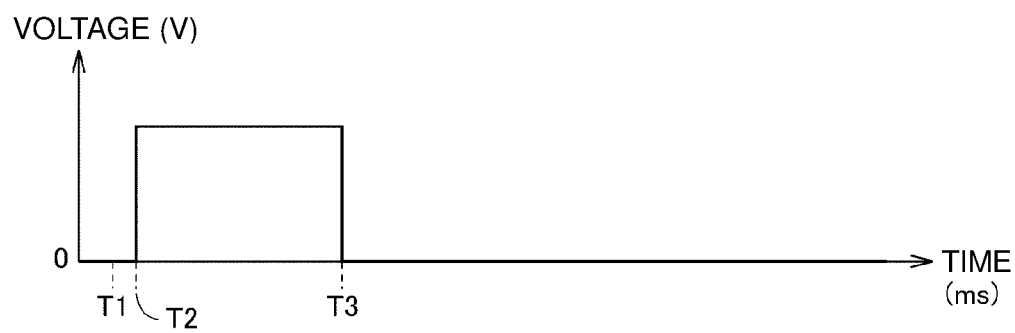
Figure 8C:
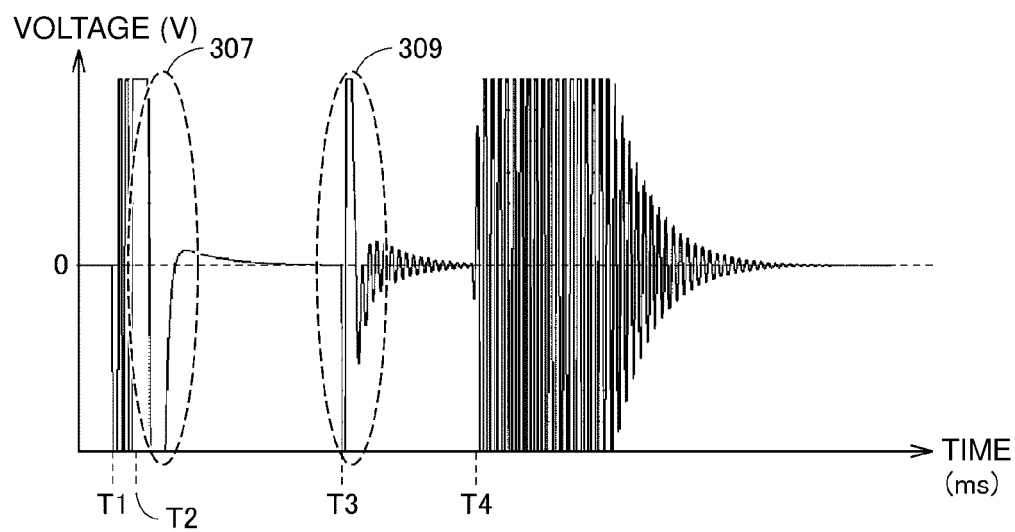

In the circuit example FIG. 7A, a semiconductor element M1 defining and functioning as a positive-channel metal oxide semiconductor (PMOS) transistor and a semiconductor element M2 defining and functioning as a negative-channel metal oxide semiconductor (NMOS) transistor are illustrated. Parasitic capacitances C1 and C2 are generated in the semiconductor element M1. Parasitic capacitances C3 and C4 are generated in the semiconductor element M2.

Figure 7B:
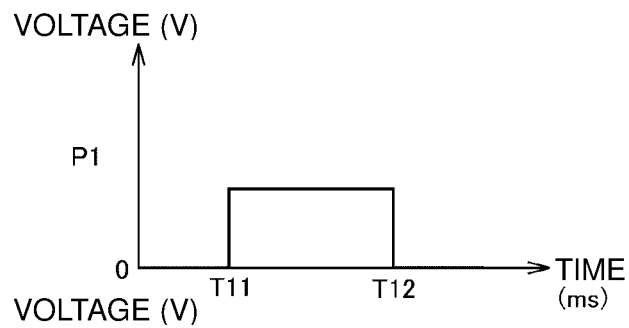

The waveform of a control signal at position P1 is illustrated in FIG. 7B. This control signal is output by a control circuit CLK. The control signal is output to the semiconductor element M1 after being inverted by an element INV and is output to the semiconductor element M2 without being inverted. In the example of FIG. 7B, the semiconductor elements M1 and M2 are driven at times T11 and T12.

Figure 7C:
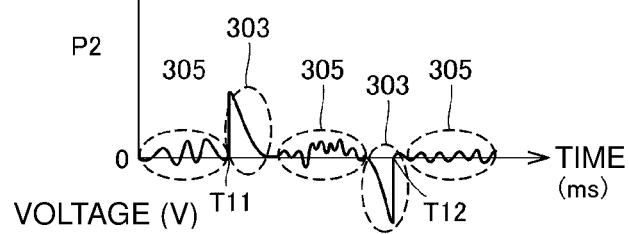
Figure 7D:
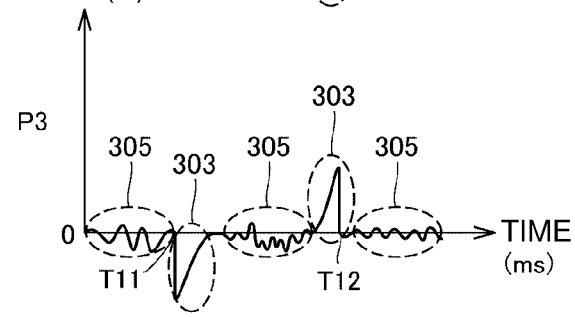

FIG. 7C illustrates changes in voltage that occur at position P2. FIG. 7D illustrates changes in voltage that occur at position P3. As illustrated in FIGS. 7C and 7D, so-called potential jumps (ringing) caused by the parasitic capacitances C1 to C4 occur at the times T11 and T12 when the semiconductor elements M1 and M2 are driven (refer to dotted lines 303). In addition, noise signals generated by the control circuit CLK pass through the parasitic capacitances C1 to C4 and flow into a signal line A-Z (refer to dotted lines 305).

Noise signals generated by switching of the semiconductor elements are generated in the ultrasonic sensor 100X according to the comparative example. FIG. 8A illustrates a control signal output from the ultrasonic sensor 100X to the signal generating circuit 104 (refer to FIG. 6). FIG. 8B illustrates a control signal output from the ultrasonic sensor 100X to the semiconductor element 120. FIG. 8C illustrates the output waveform of the ultrasonic sensor 100X.

As illustrated in FIG. 8C, potential jumps are generated as noise signals at the times T2 and T3 at which the semiconductor element 120 is driven (refer to dotted lines 307 and 309). Typically, the strength of a reception signal generated by a reflected wave from a target is very low, and therefore the gain in the reception circuit is several thousand times to several tens of thousands of times. Therefore, even in the case where the noise signals themselves are weak, the noise signals will be amplified several thousand times to several tens of thousands of times. The amplified noise signals flow to the reception circuit 110 and appear in the output waveform.

In contrast, as illustrated in FIG. 1, the ultrasonic sensor 100 according to the first preferred embodiment does not require a semiconductor element for the reception circuit 110. Thus, since a noise signal generated by switching of a semiconductor element is not generated in the reception circuit 110, the above-described problem does not occur.

Figure 9:
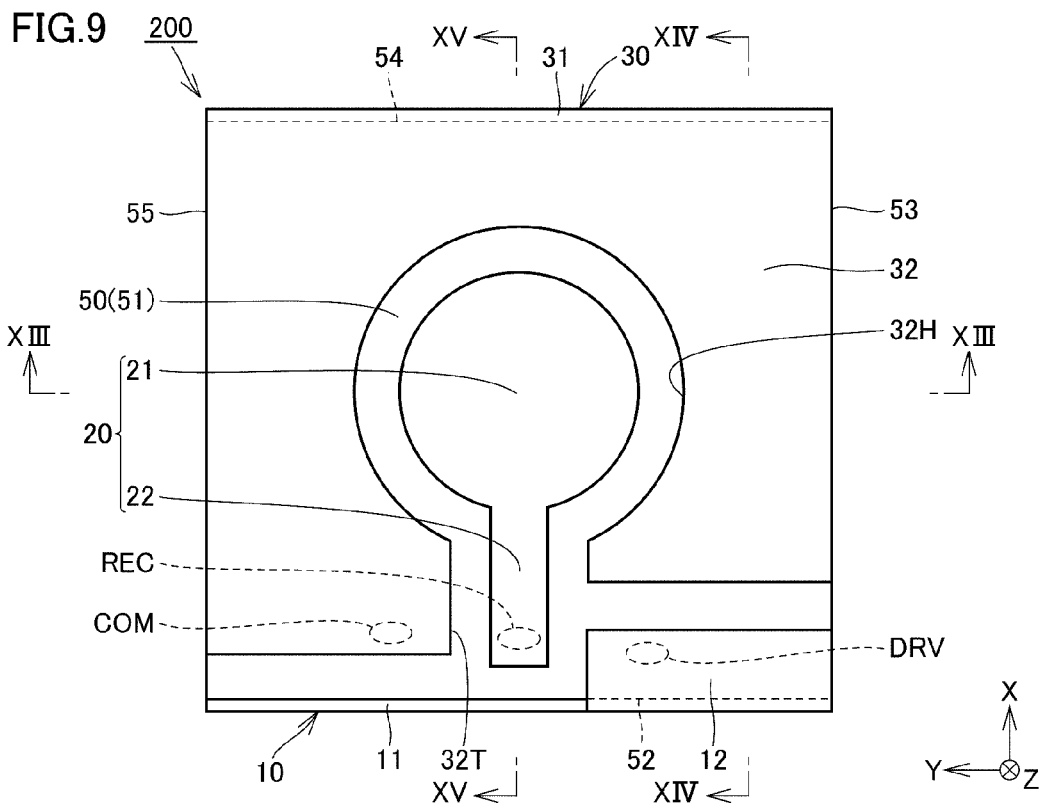
FIG. 9 is a plan view illustrating a piezoelectric element according to the first preferred embodiment of the present invention.
Figure 10:
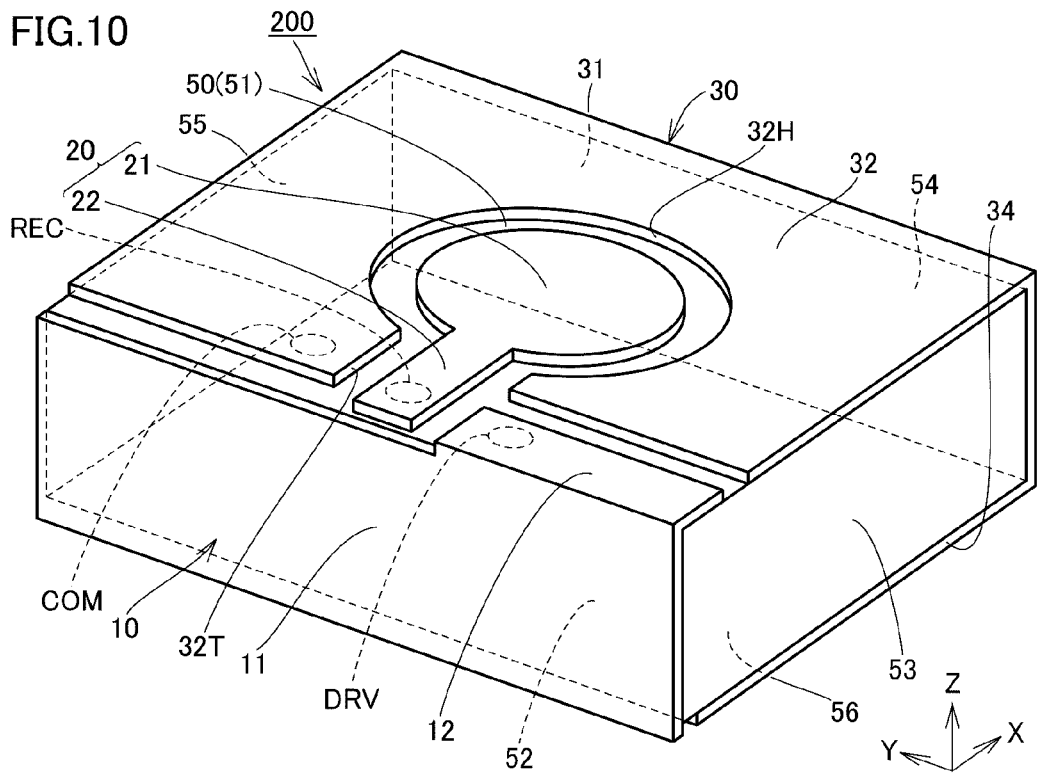
FIG. 10 is a perspective view illustrating the piezoelectric element according to the first preferred embodiment of the present invention.
Figure 11:
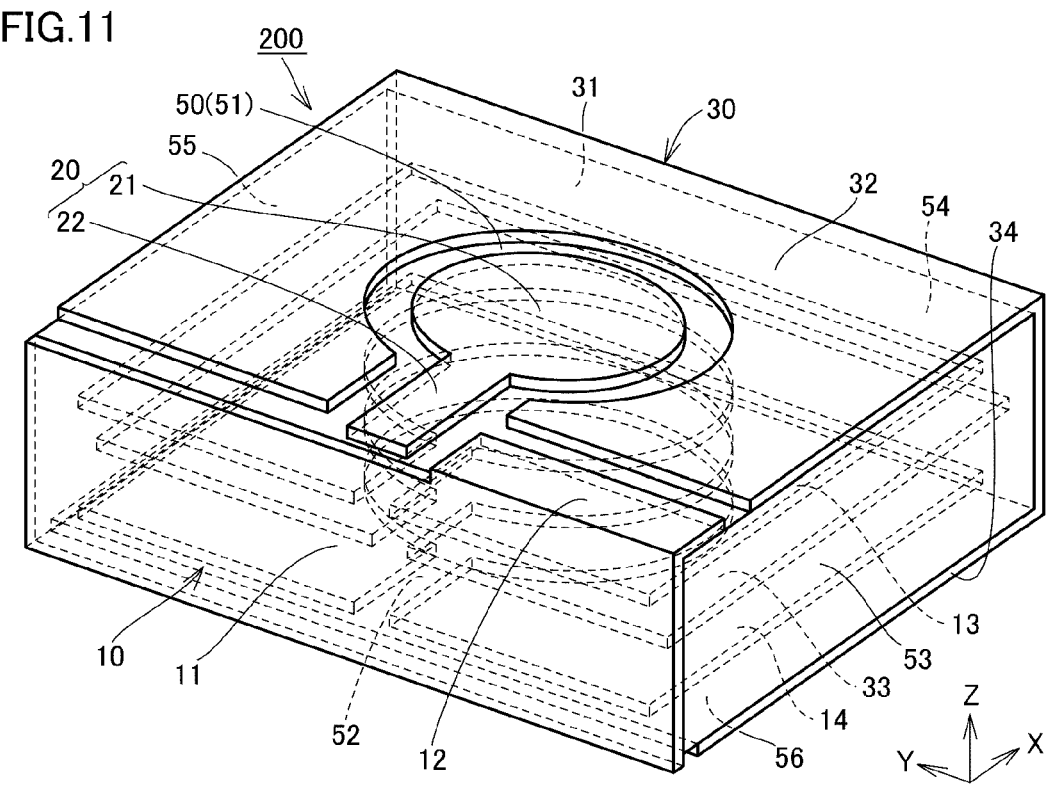
FIG. 11 is a perspective view illustrating the piezoelectric element according to the first preferred embodiment of the present invention and the internal structure thereof.
Figure 12:
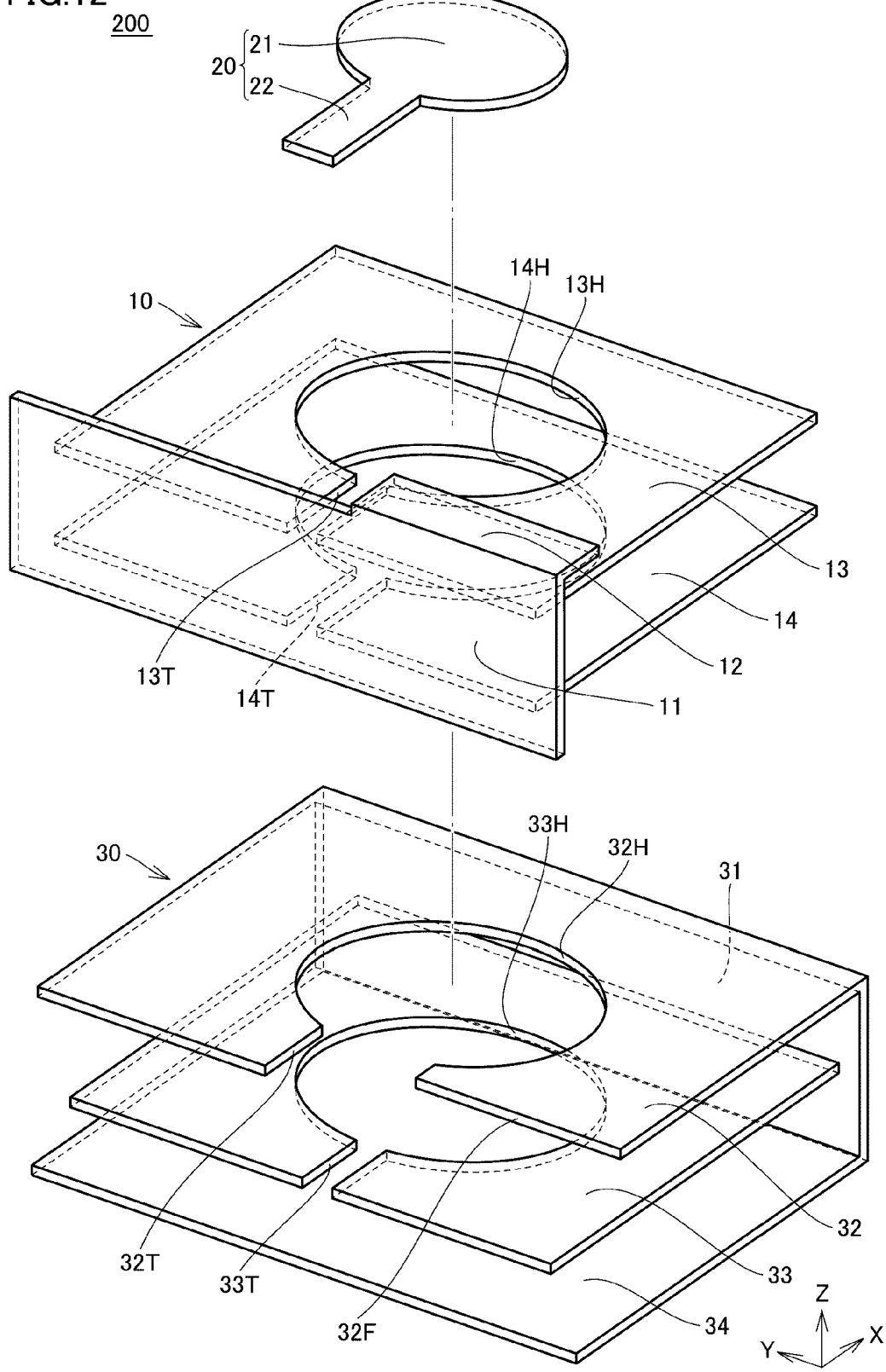
FIG. 12 is a perspective view illustrating a transmission electrode, a reception electrode and a common electrode of the piezoelectric element according to the first preferred embodiment of the present invention.
Figure 13:
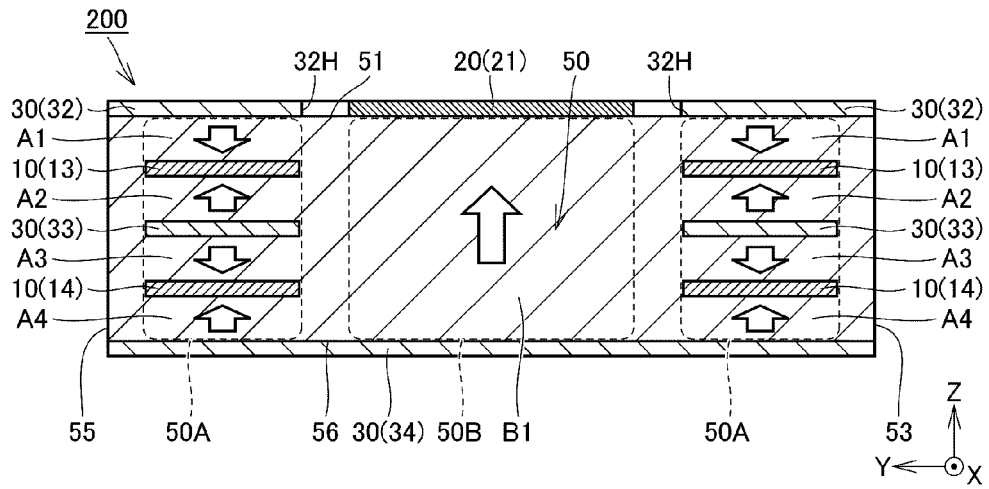
FIG. 13 is a sectional view looking in the direction of arrows and taken along line XIII-XIII in FIG. 9.
Figure 14:
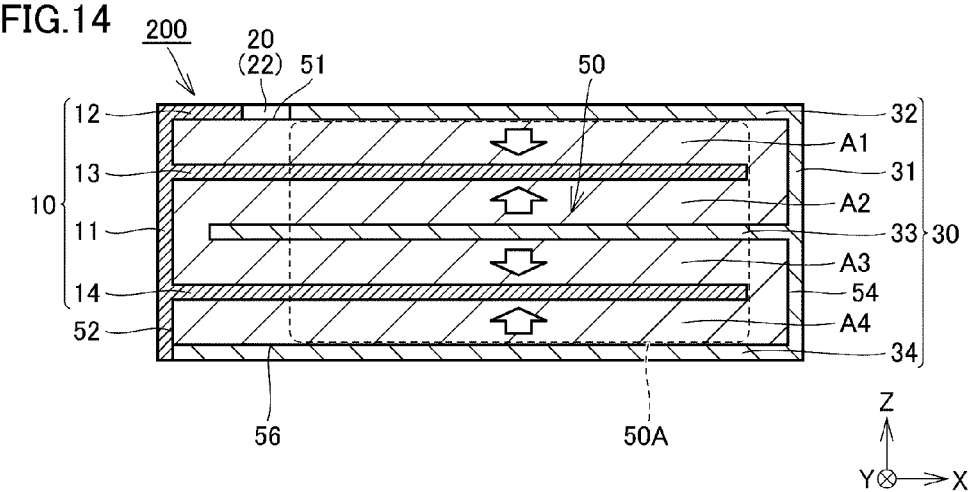
FIG. 14 is a sectional view looking in the direction of arrows and taken along line XIV-XIV in FIG. 9.
Figure 15:
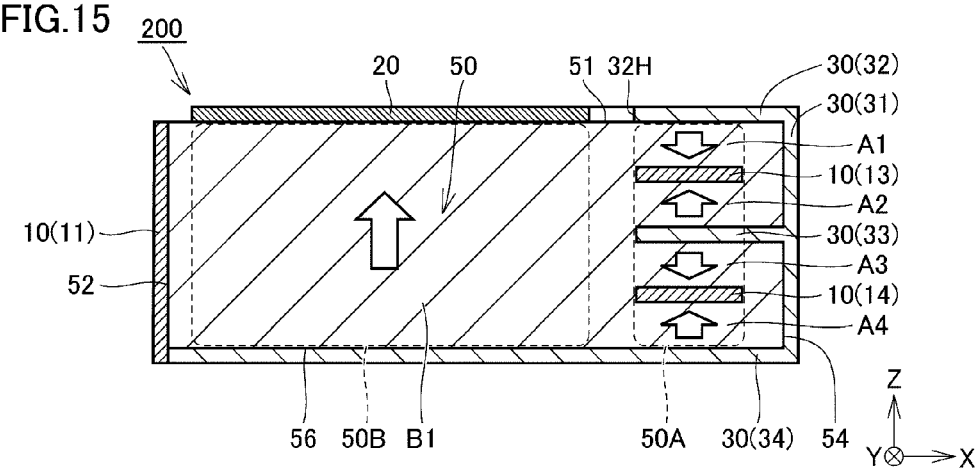
FIG. 15 is a sectional view looking in the direction of arrows and taken along line XV-XV in FIG. 9.

The structure of the piezoelectric element 200 of the ultrasonic sensor 100 will be described while referring to FIGS. 9 to 15. FIG. 9 is a plan view illustrating the piezoelectric element 200. FIG. 10 is a perspective view illustrating the piezoelectric element 200. FIG. 11 is a perspective view illustrating the piezoelectric element 200 and the internal structure thereof. FIG. 12 is a perspective view illustrating the transmission electrode 10, the reception electrode 20 and the common electrode 30 of the piezoelectric element 200. FIG. 13 is a sectional view looking in the direction of arrows and taken along line XIII-XIII in FIG. 9. FIG. 14 is a sectional view looking in the direction of arrows and taken along line XIV-XIV in FIG. 9. FIG. 15 is a sectional view looking in the direction of arrows and taken along line XV-XV in FIG. 9.

In a multilayer ultrasonic sensor, as the number of stacked layers of the piezoelectric element increases, the acoustic pressure at the time of transmission of an ultrasonic wave increases, but the sensitivity at the time of reception of a reflected wave decreases. Conversely, as the number of stacked layers of the piezoelectric element decreases, the acoustic pressure at the time of transmission of an ultrasonic wave decreases, but the sensitivity at the time of reception of a reflected wave increases. Focusing on this point, the ultrasonic sensor 100 has a structure such that the number of stacked layers of the piezoelectric element is larger in the transmission region 50A than in the reception region 50B.

Arrows X, Y and Z are illustrated in FIGS. 9 to 15 for convenience of explanation. The arrows X, Y and Z are perpendicular to each other. Hereafter, although the elements and features of the piezoelectric element 200 are sometimes described while referring to the arrows X, Y and Z, the arrangement relationships between the elements and features (characteristics related to being perpendicular and parallel) are not necessarily limited to arrangement relationships indicated by the arrows X, Y and Z.

As illustrated in FIGS. 9 to 15, the piezoelectric element 200 includes the transmission electrode 10, the reception electrode 20, the common electrode 30 and the piezoelectric body 50. The piezoelectric body 50 preferably has a substantially rectangular parallelepiped outer shape (refer to FIGS. 10 and 11) and the piezoelectric body 50 includes an upper surface 51, side surfaces 52 to 55 and a lower surface 56.

The upper surface 51 is a surface of the piezoelectric body 50 that is located on the arrow Z direction side and the lower surface 56 is a surface of the piezoelectric body 50 that is located on the opposite side to the arrow Z direction side. The side surfaces 52 and 54 are surfaces of the piezoelectric body 50 that are perpendicular to the arrow X direction and have a positional relationship of facing each other. The side surfaces 53 and 55 are surfaces of the piezoelectric body 50 that are perpendicular to the arrow Y direction and have a positional relationship of facing each other.

The transmission electrode 10 includes a side wall portion 11, an upper surface portion 12 and middle portions 13 and 14 (refer to FIG. 12). The side wall portion 11, the upper surface portion 12 and the middle portions 13 and 14 each have a plate shape. The side wall portion 11 faces the side surface 52 of the piezoelectric body 50 (refer to FIG. 10) and contact the side surface 52. The side wall portion 11 has a surface shape that covers the entirety of the side surface 52 of the piezoelectric body 50 (refer to FIGS. 9, 14 and 15).

The upper surface portion 12 is connected to an end portion of the side wall portion 11 on the arrow Z direction side (and on side in direction opposite to that of arrow Y) and is arranged on the upper surface 51 of the piezoelectric body 50. The upper surface portion 12 has a smaller width than the side wall portion 11, "width" referring to the dimension in the arrow Y direction. An end portion of the upper surface portion 12 in the direction opposite to that of the arrow Y has a flush relationship with the side surface 53 of the piezoelectric body 50. The terminal DRV is provided on the upper surface portion 12. A wiring line (not illustrated) is connected to the terminal DRV.

The upper surface portion 12 and the middle portions 13 and 14 have a parallel positional relationship with each other and the middle portions 13 and 14 are located closer to the side in the opposite direction to the arrow Z than the upper surface portion 12. The middle portion 13 is located between the upper surface portion 12 and the middle portion 14. The middle portion 13 and the middle portion 14 face each other with a space therebetween. The middle portions 13 and 14 are parts of the transmission electrode 10 that are arranged inside the piezoelectric body 50 and cannot be seen when the piezoelectric element 200 is in its completed state (refer to FIG. 10). This will be described in detail later, but a middle portion 33 of the common electrode 30 is arranged between the middle portion 13 and the middle portion 14 (refer to FIGS. 13 to 15 etc.).

Hollow portions 13H and 14H (FIG. 12), which have a circular shape, are respectively provided inside the middle portions 13 and 14. The sizes (outer diameters) of the hollow portions 13H and 14H are larger than the size (outer diameter) of a disk portion 21 of the reception electrode 20. The positions of the hollow portions 13H and 14H correspond to the position of the disk portion 21 of the reception electrode 20. The hollow portions 13H and 14H are arranged at positions so as to not overlap a projected image of the disk portion 21 when then disk portion 21 of the reception electrode 20 is projected in a direction opposite to that of the arrow Z (refer to FIGS. 13 and 15).

Cut out portions 13T and 14T are also respectively provided inside the middle portions 13 and 14. The cut out portions 13T and 14T extend from the side where the hollow portions 13H and 14H are located to the side where the side surface 52 of the piezoelectric body 50 is located (in direction opposite to that of the arrow X). The positions of the cut out portions 13T and 14T correspond to the position of an extending portion 22 of the reception electrode 20. As illustrated in FIGS. 12 and 14, end portions of the middle portions 13 and 14 in a direction opposite to that of the arrow X are connected to the side wall portion 11. On the other hand, end portions of the middle portions 13 and 14 in the arrow X direction are not connected to a side wall portion 31 of the common electrode 30 and are separated from the side wall portion 31.

The reception electrode 20 includes a disk portion 21 and an extending portion 22 and has a plate shape on the whole (refer to FIG. 12). The extending portion 22 has a rectangular or substantially rectangular outer shape and extends from an outer edge of the disk portion 21 toward the outside. The extending portion 22 is provided with the terminal REC. A wiring line (not illustrated) is connected to the terminal REC.

The reception electrode 20 is arranged on the upper surface 51 such that the disk portion 21 is located in the center of the upper surface 51 of the piezoelectric body 50. The extending portion 22 extends from the side where the disk portion 21 is located toward the side where the side surface 52 of the piezoelectric body 50 is located (in direction opposite to that of arrow X).

The common electrode 30 includes a side wall portion 31, an upper surface portion 32, a middle portion 33 and a lower surface portion 34 (refer to FIG. 12). The side wall portion 31, the upper surface portion 32, the middle portion 33 and the lower surface portion 34 each have a plate shape. The side wall portion 31 faces the side surface 54 of the piezoelectric body 50 (refer to FIG. 10) and contact the side surface 54. The side wall portion 31 has a surface shape that covers the entirety of the side surface 54 of the piezoelectric body 50 (refer to FIGS. 9, 14 and 15). The lower surface portion 34 faces the lower surface 56 of the piezoelectric body 50 and so as to contact the lower surface 56. The lower surface portion 34 has a surface shape that covers the entirety of the lower surface 56 of the piezoelectric body 50.

The upper surface portion 32 is connected to an end portion of the side wall portion 31 on the arrow Z direction side and is arranged on the upper surface 51 of the piezoelectric body 50. The width of the upper surface portion 32 is equal or substantially equal to the width of the upper surface 51 of the piezoelectric body 50, "width" referring to the dimension in the arrow Y direction. The two end portions of the upper surface portion 32 in the arrow Y direction respectively have a flush relationship with the side surface 53 and 55 of the piezoelectric body 50. The terminal COM is provided on the upper surface portion 32. A wiring line (not illustrated) is connected to the terminal COM.

The upper surface portion 32, the middle portion 33 and the lower surface portion 34 have a parallel positional relationship with each other, and the middle portion 33 and the lower surface portion 34 are located closer to the side in the opposite direction to the arrow Z than the upper surface portion 32. The middle portion 33 is located between the upper surface portion 32 and the lower surface portion 34. The middle portion 33 is part of the common electrode 30 that is arranged inside the piezoelectric body 50 and cannot be seen when the piezoelectric element 200 is in its completed state (refer to FIG. 10).

Hollow portions 32H and 33H (refer to FIG. 12), which have a circular or substantially circular shape, are respectively provided inside the upper surface portion 32 and the middle portion 33. The sizes (outer diameters) of the hollow portions 32H and 33H are larger than the size (outer diameter) of the disk portion 21 of the reception electrode 20. The positions of the hollow portions 32H and 33H correspond to the position of the disk portion 21 of the reception electrode 20. The disk portion 21 of the reception electrode 20 is arranged inside the hollow portion 32H (refer to FIG. 10). The hollow portion 33H is arranged at a position so as to not overlap a projected image of the disk portion when the disk portion 21 of the reception electrode 20 is projected in a direction opposite to that of the arrow Z (refer to FIGS. 13 and 15).

Cut out portions 32T and 33T are also respectively provided inside the upper surface portion 32 and the middle portion 33. The cut out portions 32T and 33T extend from the side where the hollow portions 32H and 33H are located toward the side where the side surface 52 of the piezoelectric body 50 is located (in direction opposite to that of the arrow X). The positions of the cut out portions 32T and 33T correspond to the position of the extending portion 22 of the reception electrode 20. The extending portion 22 of the reception electrode 20 is arranged inside the cut out portion 32T (refer to FIG. 10). A recessed portion 32F is provided in a part of the upper surface portion 32 located in the opposite direction to that of the arrow Y. The recessed portion 32F allows for arrangement of the upper surface portion 12 of the transmission electrode 10.

As illustrated in FIGS. 12 and 14, end portions of the upper surface portion 32, the middle portion 33 and the lower surface portion 34 in the arrow X direction are connected to the side wall portion 31. On the other hand, end portions of the upper surface portion 32, the middle portion 33 and the lower surface portion 34 in the direction opposite to that of the arrow X are not connected to the side wall portion 11 of the transmission electrode 10 and are separated from the side wall portion 11.

As illustrated in FIGS. 13 to 15, the transmission region 50A and the reception region 50B are located inside the piezoelectric body 50. The transmission region 50A preferably includes a four-layer structure including piezoelectric layers A1 to A4. The white arrows in FIGS. 13 to 15 indicate the polarization directions of the piezoelectric layers.

The piezoelectric layers A1 to A4 are manufactured preferably by interposing the middle portion 13 of the transmission electrode 10, the middle portion 33 of the common electrode 30 and the middle portion 14 of the transmission electrode 10 between four piezoelectric layers, each of which includes a thin piezoelectric ceramic material having a strip shape, stacking these layers on top of one another and then firing the layers so that the layers become integrated with each other. The piezoelectric layers A1 to A4 are electrically connected in parallel with each other by the transmission electrode 10 and the common electrode 30.

The reception region 50B includes a one-layer structure including a piezoelectric layer B1. The piezoelectric layer B1 is manufactured preferably by stacking four piezoelectric layers, each of which includes a thin piezoelectric ceramic material having a strip shape, on top of one another without interposing any electrodes between the layers and then firing the layers so that the layers become integrated with each other.

The lower surface portion 34 of the common electrode 30 extends across both the transmission region 50A and the reception region 50B. The upper surface portion 12 of the transmission electrode 10 faces the lower surface portion 34 of the common electrode 30 with the transmission region 50A including the piezoelectric layers A1 to A4 interposed therebetween. The disk portion 21 of the reception electrode 20 faces the lower surface portion 34 of the common electrode 30 with the reception region 50B including the piezoelectric layer B1 interposed therebetween. In other words, a region of the piezoelectric body 50 located between the upper surface portion 12 of the transmission electrode 10 and the lower surface portion 34 of the common electrode 30 defines and functions as the transmission region 50A and a region of the piezoelectric body 50 located between the disk portion 21 of the reception electrode 20 and the lower surface portion 34 of the common electrode 30 defines and functions as the reception region 50B. As illustrated in FIGS. 13 and 15, in this preferred embodiment, the transmission region 50A and the reception region 50B are located at positions that are adjacent to each other in the X-Y plane direction.

As described above, the ultrasonic sensor 100 according to this preferred embodiment puts the path 109 between the transmission electrode 10 and the reception electrode 20 into a conductive state by driving the semiconductor element 107, which is electrically connected to the transmission electrode 10 and the reception electrode 20, after stopping application of an alternating-current voltage. As a result, the ultrasonic sensor 100 feeds a reverberation signal, which is output from the reception region 50B in accordance with a reverberant vibration generated after transmission of the ultrasonic wave, back to the transmission electrode 10.

The closer an object is to the ultrasonic sensor 100, the shorter the time taken from transmission of the ultrasonic wave until reception of the reflected wave. Since the ultrasonic sensor 100 detects a reflected wave without waiting for the reverberant vibration to subside, the ultrasonic sensor 100 detects a reflected wave from an object even in the case where the object is close to the ultrasonic sensor 100.

In addition, in the ultrasonic sensor 100 according to the first preferred embodiment, an electrode that detects the reverberant vibration and an electrode that receives the ultrasonic wave are provided as a single reception electrode 20. Therefore, the ultrasonic sensor 100 utilizes the same circuit elements in a detection circuit that detects a reverberant vibration and a reception circuit that receives a reflected wave. Thus, the circuit configuration of the ultrasonic sensor 100 becomes simpler and the ultrasonic sensor 100 is reduced in size.

In particular, in this preferred embodiment, there is no need to provide a semiconductor element for the reception circuit 110. Therefore, a noise signal generated by switching of a semiconductor element is significantly reduced or prevented in the ultrasonic sensor 100. As a result, the ultrasonic sensor 100 significantly reduces or prevents a signal/noise (S/N) ratio.

Figure 24:
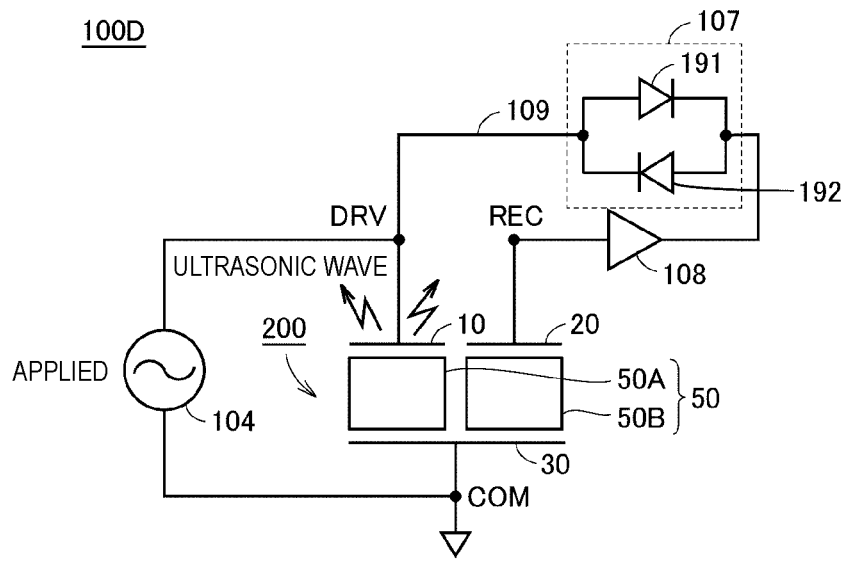
FIG. 24 illustrates an example of the circuit configuration of an ultrasonic sensor according to a fifth preferred embodiment of the present invention.

Although an example has been described in the above-described preferred embodiment in which the semiconductor element 107 is a transistor that is driven by the control circuit 101, the semiconductor element 107 is not limited to being a transistor. For example, the semiconductor element 107 may be a diode as illustrated in FIG. 24, which will be described later. In this case, the reverberation signal is higher than a threshold voltage (for example, forward voltage) at which the diode is driven and an output signal that accompanies a reflected wave of an ultrasonic wave is lower than the threshold voltage. Therefore, the reverberation signal is fed back to the transmission electrode 10 as a voltage in the step of significantly reducing or preventing the reverberant vibration, but the output signal is not fed back to the transmission electrode 10 in the step of receiving a reflected wave of an ultrasonic wave. Therefore, the same effect as with the ultrasonic sensor 100 according to the first preferred embodiment is obtained in this case as well.

Second Preferred Embodiment

Figure 16:
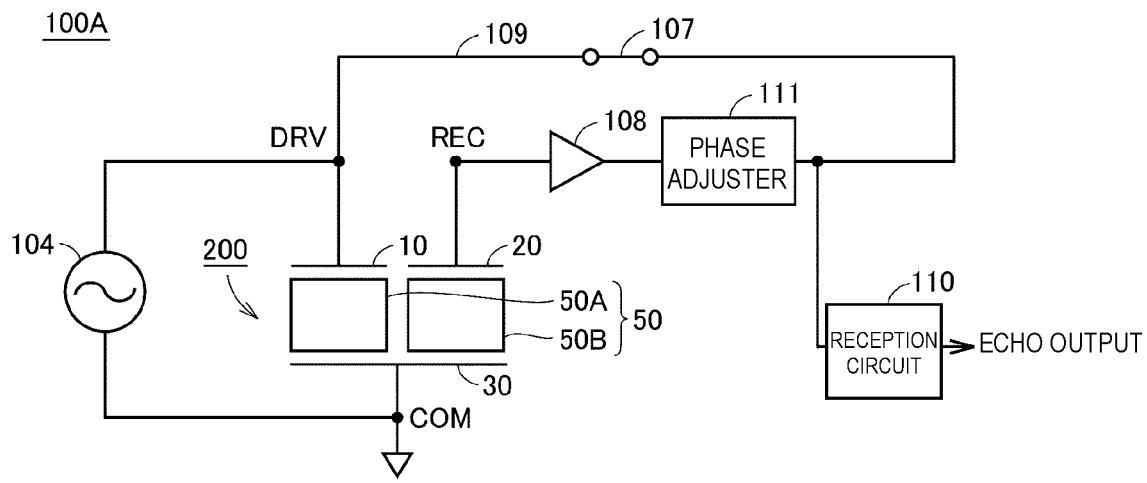
FIG. 16 illustrates an example of the circuit configuration of an ultrasonic sensor according to a second preferred embodiment of the present invention.

An ultrasonic sensor 100A according to a second preferred embodiment of the present invention will be described while referring to FIG. 16. FIG. 16 illustrates an example of the circuit configuration of the ultrasonic sensor 100A.

The ultrasonic sensor 100A differs from the ultrasonic sensor 100 according to the first preferred embodiment in that the ultrasonic sensor 100A further includes a phase adjuster 111. Except for the phase adjuster 111, the rest of the configuration is the same as that described above and therefore description thereof will not be repeated.

As illustrated in FIG. 16, the ultrasonic sensor 100A includes the signal generating circuit 104, the semiconductor element 107, the amplifier 108, the reception circuit 110, the phase adjuster 111 and the piezoelectric element 200. The phase adjuster 111 is electrically connected to the semiconductor element 107 and the amplifier 108 along the path 109.

The reverberation signal may be shifted more than expected due to circuit characteristics, the surrounding environment (for example, temperature) and so forth.

The phase adjuster 111 adjusts the phase of the reverberation signal from the reception region 50B so that the reverberant vibration is optimally significantly reduced or prevented and feeds the phase-adjusted reverberation signal back to the transmission electrode 10. The size of the phase shift applied by the phase adjuster 111 may be determined in advance at the design stage or may be changed in accordance with the surrounding environment (for example, temperature etc.), the circuit characteristics and so forth.

As described above, the ultrasonic sensor 100A according to the second preferred embodiment feeds back a phase-adjusted reverberation signal to the transmission electrode 10. Consequently, the ultrasonic sensor 100A significantly reduces or prevents the reverberant vibration with greater certainty.

Third Preferred Embodiment

Figure 17:
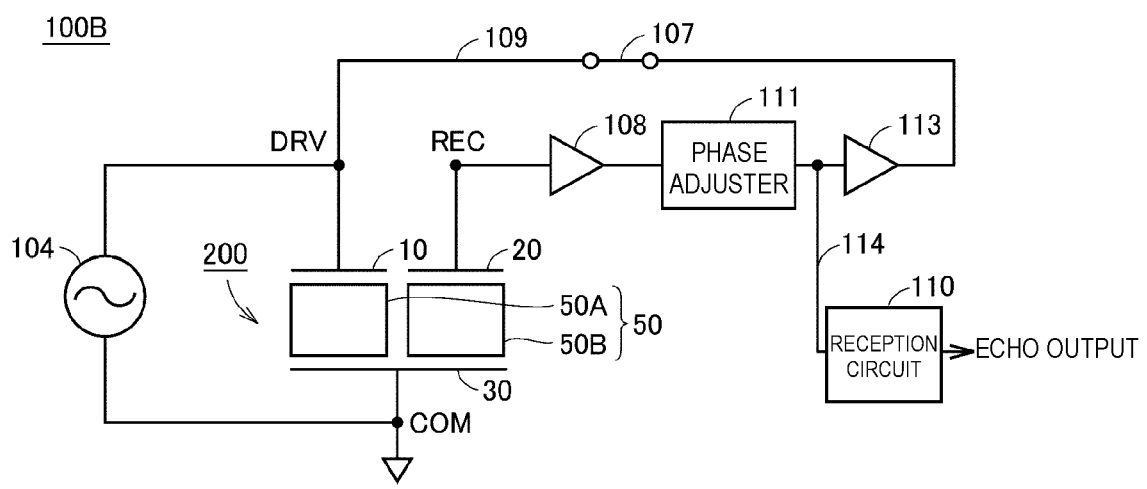
FIG. 17 illustrates an example of the circuit configuration of an ultrasonic sensor according to a third preferred embodiment of the present invention.

An ultrasonic sensor 100B according to a third preferred embodiment of the present invention will be described while referring to FIG. 17. FIG. 17 illustrates an example of the circuit configuration of the ultrasonic sensor 100B.

The ultrasonic sensor 100B differs from the ultrasonic sensor 100A according to the second preferred embodiment in that the ultrasonic sensor 100B further includes a buffer circuit 113. Apart from the buffer circuit 113, the rest of the configuration is the same as that described above and therefore description thereof will not be repeated.

As illustrated in FIG. 17, the ultrasonic sensor 100B includes the signal generating circuit 104, the semiconductor element 107, the amplifier 108, the reception circuit 110, the phase adjuster 111, the buffer circuit 113 and the piezoelectric element 200. The buffer circuit 113 is electrically connected to the phase adjuster 111 and the semiconductor element 107 along the path 109.

As a result of being provided with the buffer circuit 113, the ultrasonic sensor 100B prevents a noise signal from flowing from the transmission electrode 10 into the reception circuit 110 via the path 109. As a result, the SN ratio is reduced in the reception circuit 110.

As described above, in the ultrasonic sensor 100B according to the third preferred embodiment, the path 109, which is provided in order to reduce the reverberant vibration, and a path 114, which is provided in order to receive an ultrasonic wave, are electrically isolated from each other with greater certainty by the buffer circuit 113. Thus, the ultrasonic sensor 100B prevents a noise signal from flowing into the reception circuit 110.

Fourth Preferred Embodiment

Figure 18:
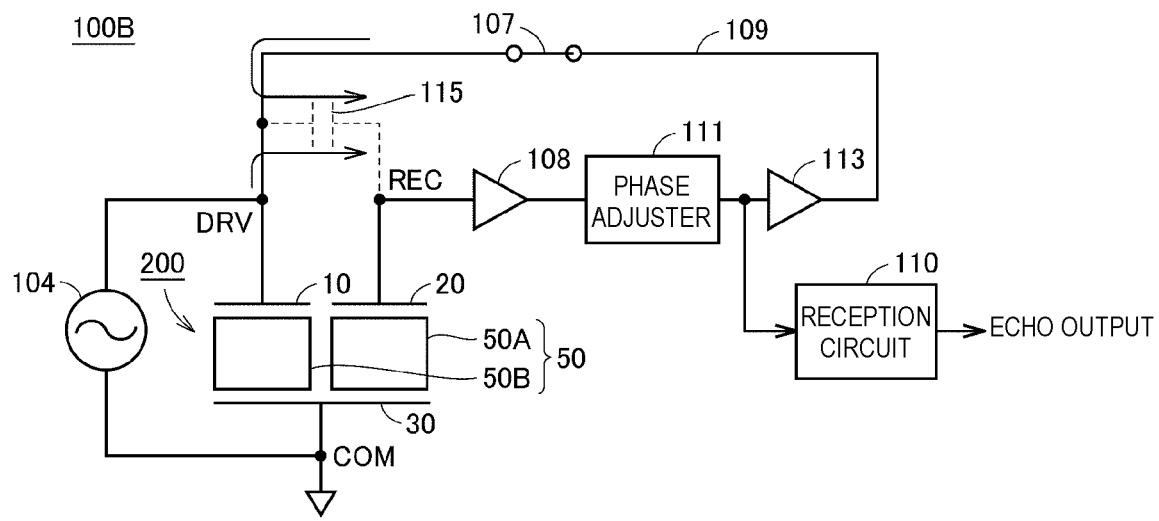
FIG. 18 illustrates a parasitic capacitance generated in the ultrasonic sensor according to the third preferred embodiment of the present invention.

Knowledge newly discovered in the ultrasonic sensor 100B according to the third preferred embodiment will be described while referring to FIG. 18. FIG. 18 illustrates a parasitic capacitance generated in the ultrasonic sensor 100B.

The present inventors newly discovered that a parasitic capacitance 115 is generated between the transmission electrode 10 and the reception electrode 20. As far as the present inventors are aware, there are no prior art documents that disclose that the parasitic capacitance 115 is generated between the transmission electrode 10 and the reception electrode 20. The present inventors think that the reason this has not been discovered to date is that an ultrasonic sensor with a three terminal structure including the transmission electrode 10, the reception electrode 20 and the common electrode 30 is in itself new.

A reverberation signal output from the transmission region 50A or a reverberation signal fed back from the reception region 50B may flow into the path 109 via the parasitic capacitance 115. Consequently, there is a possibility that the piezoelectric element 200 may undergo abnormal oscillation. An ultrasonic sensor 100C according to a fourth preferred embodiment prevents such an abnormal oscillation as described below.

Figure 19:
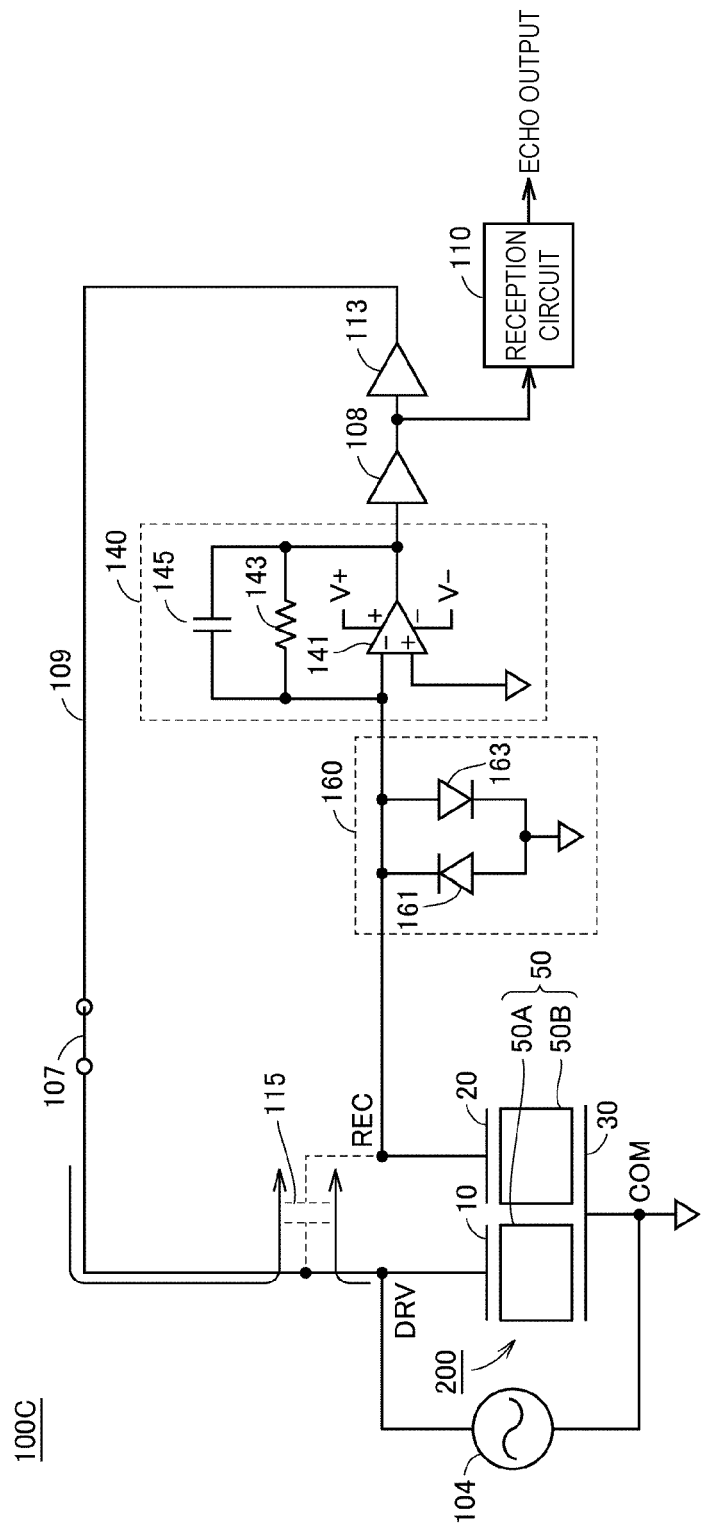
FIG. 19 illustrates an example of the circuit configuration of an ultrasonic sensor according to a fourth preferred embodiment of the present invention.

The ultrasonic sensor 100C according to the fourth preferred embodiment will be described while referring to FIG. 19. FIG. 19 illustrates an example of the circuit configuration of the ultrasonic sensor 100C.

The ultrasonic sensor 100C differs from the ultrasonic sensor 100B according to the third preferred embodiment in that the ultrasonic sensor 100C further includes a filter circuit 140, which defines and functions as an I/V conversion circuit, and a protection circuit 160. Apart from the filter circuit 140 and the protection circuit 160, the rest of the configuration is the same that as described above and therefore description thereof will not be repeated.

As illustrated in FIG. 19, the ultrasonic sensor 100C includes the signal generating circuit 104, the semiconductor element 107, the amplifier 108, the reception circuit 110, the phase adjuster 111, the buffer circuit 113, the filter circuit 140 and the protection circuit 160.

The filter circuit 140 filters out a signal of a frequency band that causes the ultrasonic sensor 100C to undergo abnormal oscillation. The filter circuit 140 is provided along the path 109. Thus, the filter circuit 140 filters out a noise signal that flows into the path 109 from the parasitic capacitance 115 and prevents the ultrasonic sensor 100C from undergoing abnormal oscillation.

In the example in FIG. 19, the filter circuit 140 is preferably an I/V conversion circuit including an operational amplifier 141, a resistor 143 and a capacitor 145. It is sufficient that the filter circuit 140 have a function of cutting a specific frequency by converting a current into a voltage. For example, a charge amplifier may be used instead of the operational amplifier 141.

An inverting input terminal of the operational amplifier 141 is electrically connected to the reception electrode 20 (terminal REC). A non-inverting input terminal of the operational amplifier 141 is grounded. An output terminal of the operational amplifier 141 is electrically connected to the amplifier 108.

The resistor 143 is electrically connected to the inverting input terminal of the operational amplifier 141 and to the output terminal of the operational amplifier 141. The capacitor 145 is electrically connected to the inverting input terminal of the operational amplifier 141 and to the output terminal of the operational amplifier 141. The operational amplifier 141, the resistor 143 and the capacitor 145 are connected in parallel with each other.

As a result of having this configuration, the filter circuit 140 defines and functions as a low pass filter based on the ratio between the parasitic capacitance 115 and the capacitance of the capacitor 145. For example, this ratio is expressed as a value obtained by dividing the parasitic capacitance 115 by the capacitance of the capacitor 145. The capacitance of the capacitor 145 is preferably larger than the parasitic capacitance 115. Thus, the filter circuit 140 reduces the gain response to a signal component of a frequency band that causes abnormal oscillation and causes the ultrasonic sensor 100C to operate more stably.

In the example in FIG. 19, the filter circuit 140 is illustrated as being an I/V conversion circuit that defines and functions as a low pass filter, but the filter circuit 140 is not limited to being an I/V conversion circuit. For example, the filter circuit 140 may be a band pass filter or may be a charge amplifier circuit. A band pass filter allows a frequency band that contains the resonant frequency of the piezoelectric element 200 to pass therethrough. In other words, the band pass filter cuts signals of frequency bands outside the resonant frequency of the piezoelectric element 200.

Circuit examples A and B in which there is a possibility that the ultrasonic sensor will undergo abnormal oscillation will be described while referring to FIGS. 20A and 20B.

FIGS. 20A and 20B illustrate examples of the circuit configurations of ultrasonic sensors 100Y and 100Z according to comparative examples.

As illustrated in the circuit example of FIG. 20A, the ultrasonic sensor 100Y includes a voltage follower circuit 170 instead of the filter circuit 140 (refer to FIG. 19). The voltage follower circuit 170 includes an operational amplifier 171. When a noise signal flows through the parasitic capacitance 115 of the ultrasonic sensor 100Y, the noise signal flows directly to the non-inverting input terminal of the operational amplifier 171. There is a possibility that the ultrasonic sensor 100Y will undergo abnormal oscillation due to this noise signal.

As illustrated in the circuit example of FIG. 20B, the ultrasonic sensor 100Z includes an inverter amplification circuit 180 instead of the filter circuit 140 (refer to FIG. 19). The inverter amplification circuit 180 includes a capacitor 181, an operational amplifier 183 and resistors 184 and 185. When a noise signal flows through the parasitic capacitance 115 of the ultrasonic sensor 100Z, the noise signal flows directly to the inverting input terminal of the operational amplifier 183. There is a possibility that the ultrasonic sensor 100Z will undergo abnormal oscillation due to this noise signal.

The protection circuit 160 will be described while referring to FIG. 19 again. A voltage that is equal to or higher than the power supply voltage may be applied to the operational amplifier 141 depending on the resonance characteristics of the ultrasonic sensor 100C. The protection circuit 160 prevents such an excessive voltage from being applied to the operational amplifier 141.

The protection circuit 160 includes diodes 161 and 163. The cathode of the diode 161 is connected to the path 109. The anode of the diode 161 is grounded. The cathode of the diode 163 is grounded. The anode of the diode 163 is connected to the path 109. The ultrasonic sensor 100C does not necessarily have to be provided with the protection circuit 160.

Continuing to refer to FIG. 19, simulation results obtained using the ultrasonic sensor 100C according to the fourth preferred embodiment will be described while referring to FIGS. 21A1-21B3. FIGS. 21A1-21B3 illustrate simulation results obtained in a case where an abnormal oscillation occurs and simulation results obtained in a case where an abnormal oscillation does not occur.

More specifically, FIGS. 21A1 and 21B1 illustrate a control signal output from the ultrasonic sensor 100C to the signal generating circuit 104. FIGS. 21A2 and 21B2 illustrate a control signal output from the ultrasonic sensor 100C to the semiconductor element 107.

FIG. 21A3 illustrates the output waveform of the ultrasonic sensor 100C in the case where the parasitic capacitance 115 is assumed to be 50 pF (pico-Farads) and the capacitance of the capacitor 145 is assumed to be 10 pF. As illustrated in FIG. 21A3, a noise signal that passes through the parasitic capacitance 115 appears as an output waveform in the period from the time T2 to the time T3 in which the reverberant vibration is significantly reduced or prevented (refer to dotted line 311). The ultrasonic sensor 100C undergoes abnormal oscillation from the time T3 onwards due to the noise signal. Therefore, the ultrasonic sensor 100C cannot detect the reflected wave received at the time T4 (refer to dotted line 313).

FIG. 21B3 illustrates the output waveform of the ultrasonic sensor 100C in the case where the parasitic capacitance 115 is assumed to be 50 pF and the capacitance of the capacitor 145 is assumed to be 100 pF. As illustrated in FIG. 21B3, a noise signal from the parasitic capacitance 115 does not appear as an output waveform in the period from the time T2 to the time T3 in which the reverberant vibration is significantly reduced or prevented (refer to dotted line 315). Therefore, the ultrasonic sensor 100C does not undergo abnormal oscillation from the time T3 onwards and is able to detect the reflected wave received at the time T4.

Figure 22A:
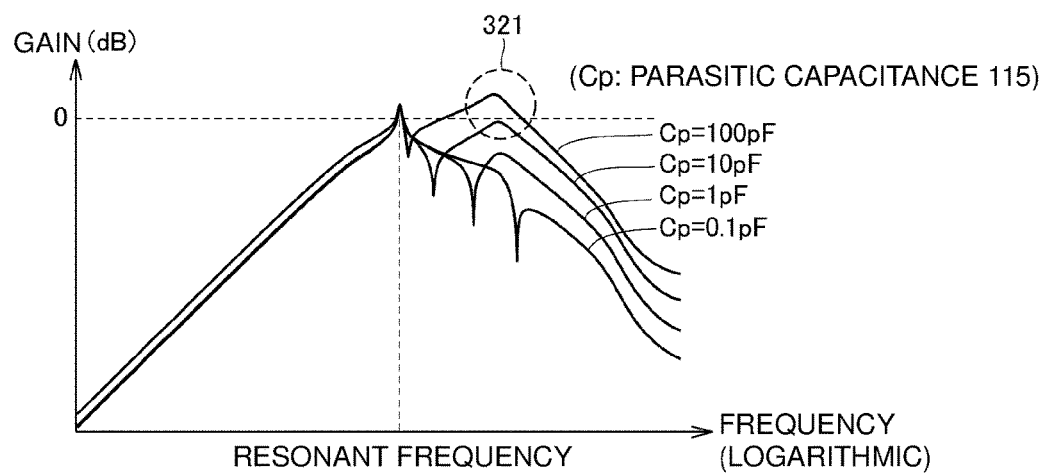
FIGS. 22A and 22B illustrate the relationship between the frequency of a signal flowing in an ultrasonic sensor when a reverberant vibration is significantly reduced or prevented and the gain of the ultrasonic sensor with respect to the signal.
Figure 22B:
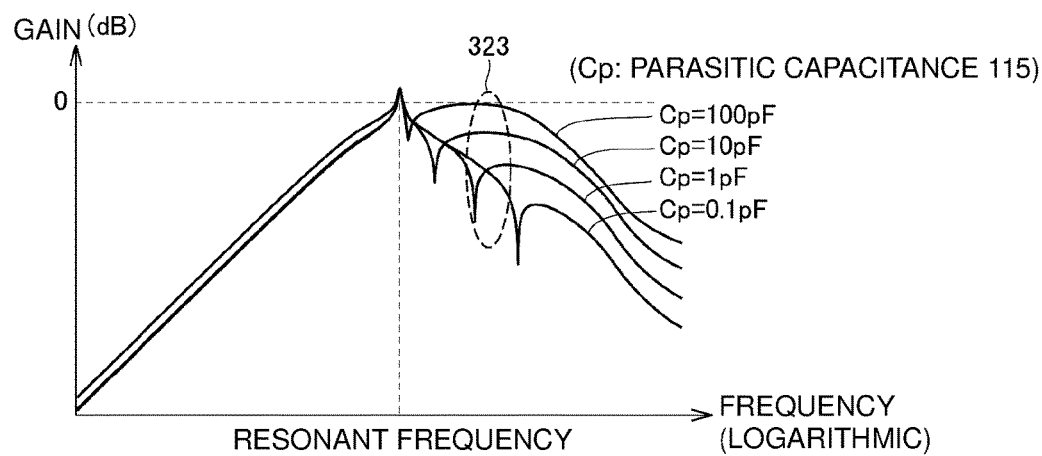

Referring once more to FIG. 19, other simulation results obtained using the ultrasonic sensor 100C according to the fourth preferred embodiment will be described while referring to FIGS. 22A and 22B. FIGS. 22A and 22B illustrate the relationship between the frequency of a signal flowing through the ultrasonic sensor 100C when the reverberant vibration is being significantly reduced or prevented and the gain of the ultrasonic sensor 100C with respect to the signal (hereafter also referred to as "open loop characteristics").

FIG. 22A illustrates open loop characteristics obtained when the parasitic capacitance 115 is made to be 0.1 pF, 1 pF, 10 pF and 100 pF for a case where the filter circuit 140 is not provided. In the case where the filter circuit 140 is not provided, the gain is 0 dB or more in a frequency band outside the resonant frequency (refer to dotted line 321). A signal of this frequency band is the cause of the abnormal oscillation.

FIG. 22B illustrates open loop characteristics obtained when the parasitic capacitance 115 is made to be 0.1 pF, 1 pF, 10 pF and 100 pF for a case where the filter circuit 140 is provided. In the example of FIG. 22B, the capacitance of the capacitor 145 of the filter circuit 140 is 100 pF. In FIG. 22B, the gain of the signal in the frequency band outside the resonant frequency is significantly reduced or prevented by the filter circuit 140.

As described above, the ultrasonic sensor 100C includes the filter circuit 140 that filters out the signal of the frequency band that causes the ultrasonic sensor 100C to undergo abnormal oscillation. Thus, the ultrasonic sensor 100C prevents the occurrence of abnormal oscillation.

Experimental Results 1

Figure 23:
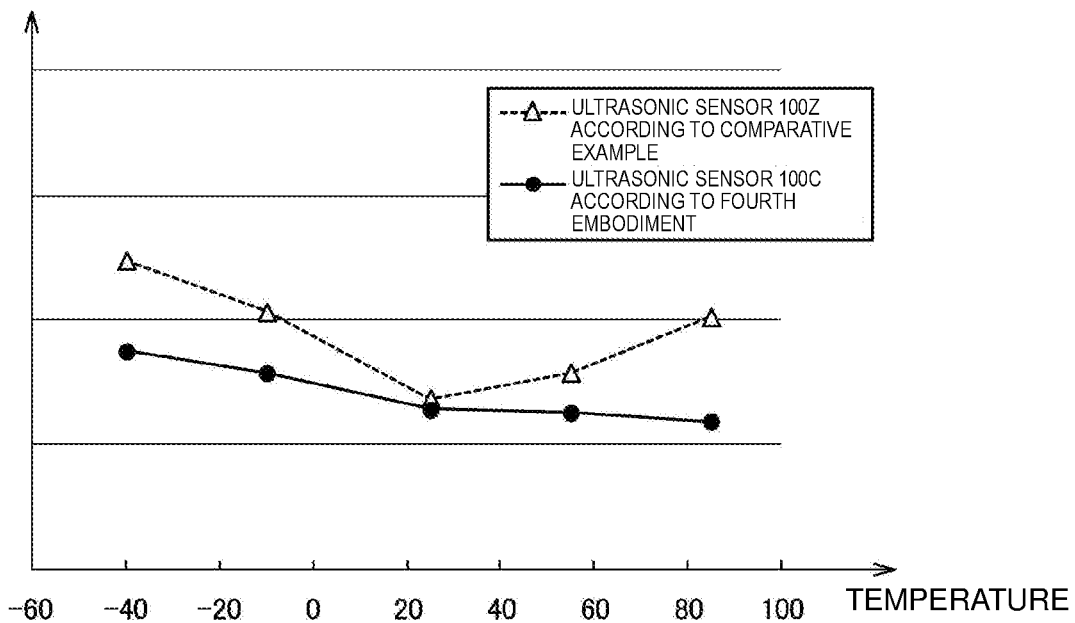
FIG. 23 illustrates differences in reverberation time with respect to temperature in an ultrasonic sensor according to the fourth preferred embodiment of the present invention and in the ultrasonic sensor according to the comparative example.

Another advantage of the ultrasonic sensor 100C according to the fourth preferred embodiment will be described while referring to FIG. 23. FIG. 23 illustrates differences in reverberation time with respect to temperature in the ultrasonic sensor 100C according to the fourth preferred embodiment and in the ultrasonic sensor 100Z according to the comparative example.

It is clear from the experimental results illustrated in FIG. 23 that the ultrasonic sensor 100C according to the fourth preferred embodiment has smaller variations in reverberation time with respect to temperature than the ultrasonic sensor 100Z according to the comparative example. The reason for these results is thought to be that the input of the I/V conversion circuit is ideally in a virtual short circuit state and therefore a signal corresponding to the vibration velocity of the ultrasonic sensor is extracted without being affected by a damping capacitance of the ultrasonic sensor and there is unlikely to be an effect due the temperature characteristics of the damping capacitance.

Fifth Preferred Embodiment

An ultrasonic sensor 100D according to a fifth preferred embodiment of the present invention will be described while referring to FIG. 24. FIG. 24 illustrates an example of the circuit configuration of the ultrasonic sensor 100D.

In the ultrasonic sensor 100 according to the first preferred embodiment, the semiconductor element 107 preferably is a transistor. In contrast, in the ultrasonic sensor 100D according to the fifth preferred embodiment, the semiconductor element 107 preferably includes diodes 191 and 192. Apart from the semiconductor element 107, the rest of the configuration is the same as that described above and therefore description thereof will not be repeated.

The diodes 191 and 192 are provided along the path 109 and are connected in parallel with each other. The cathode of the diode 191 is connected to the amplifier 108. The anode of the diode 191 is connected to the terminal DRV. The cathode of the diode 192 is connected to the terminal DRV. The anode of the diode 192 is connected to the amplifier 108.

As described above, in the ultrasonic sensor 100D according to the fifth preferred embodiment, the semiconductor element 107 includes the diodes 191 and 192. The reverberation signal is higher than a threshold voltage (for example, forward voltage) at which the diodes 191 and 192 are driven and an output signal that accompanies a reflected wave of an ultrasonic wave is lower than the threshold voltage. Therefore, the reverberation signal is fed back to the transmission electrode 10 as a voltage in the step of significantly reducing or preventing the reverberant vibration, but the output signal is not fed back to the transmission electrode 10 in the step of receiving a reflected wave of an ultrasonic wave. Therefore, the same effect as with the ultrasonic sensor 100 according to the first preferred embodiment is obtained in this case as well.

Sixth Preferred Embodiment

Figure 25:
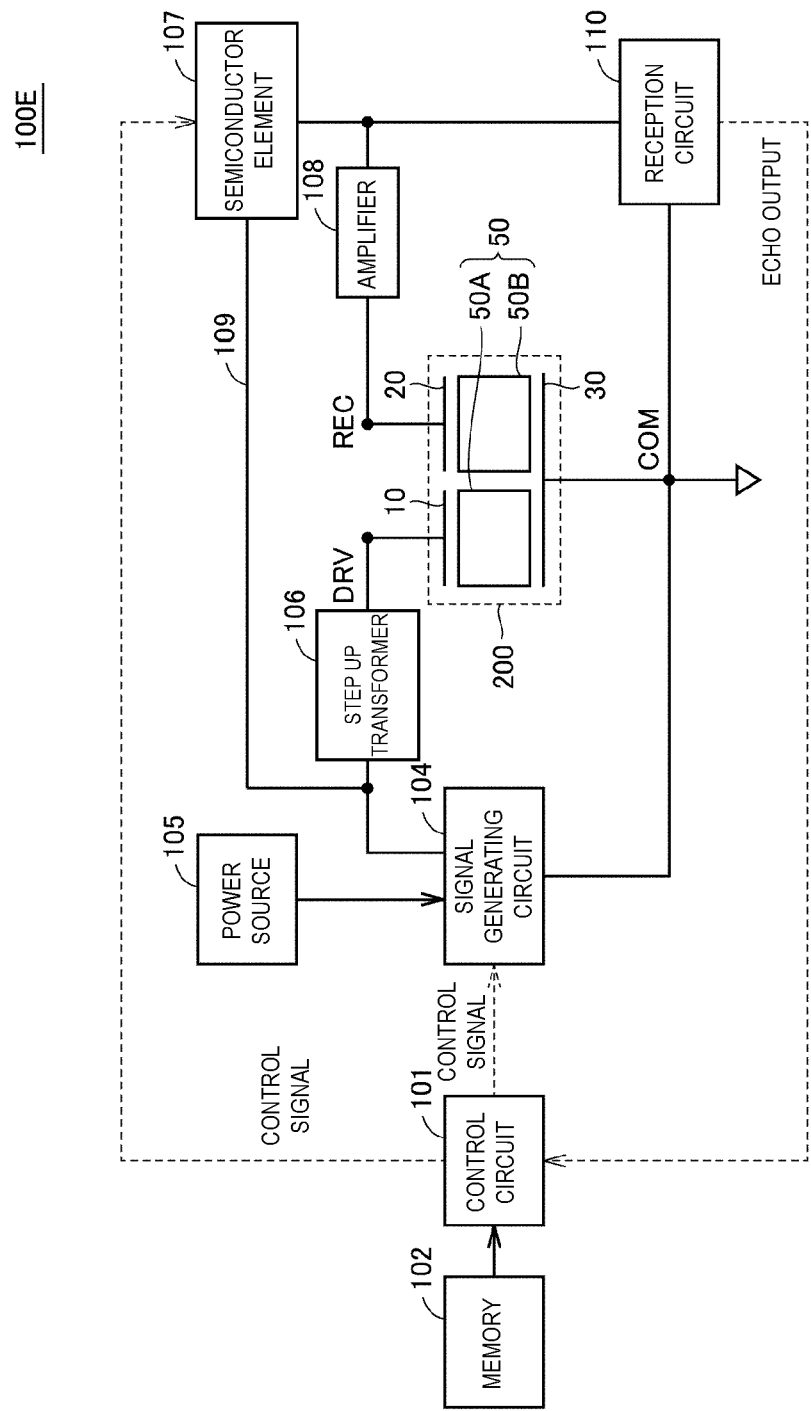
FIG. 25 illustrates an example of the circuit configuration of an ultrasonic sensor according to a sixth preferred embodiment of the present invention.

An ultrasonic sensor 100E according to a sixth preferred embodiment of the present invention will be described while referring to FIG. 25. FIG. 25 illustrates an example of the circuit configuration of the ultrasonic sensor 100E.

The ultrasonic sensor 100E according to the sixth preferred embodiment is further provided with a step up transformer 106 along the electrical path 109 that connects the transmission electrode 10 and the reception electrode 20 in the ultrasonic sensor 100 according to the first preferred embodiment. More specifically, the step up transformer 106 is connected to a position on the terminal DRV side of the transmission electrode 10, that is, in front of the transmission electrode 10. Apart from the step up transformer 106, the rest of the configuration is the same as that described above and therefore description thereof will not be repeated.

The step up transformer 106 includes a primary coil and a secondary coil. The primary coil of the step up transformer 106 is connected to the signal generating circuit 104 and the semiconductor element 107. The secondary coil of the step up transformer 106 is connected to the terminal DRV. The ratio between the primary coil side voltage and the secondary coil side voltage is 1:10, for example. As a result of the above-described configuration, the reverberation signal is amplified by the step up transformer 106 upon being fed back to the transmission terminal from the reception electrode 20. As a result, the reverberant vibration is significantly reduced or prevented even when the reverberation signal is very small.

Seventh Preferred Embodiment

An overview of an ultrasonic sensor 100F according to a seventh preferred embodiment of the present invention will be described. The ultrasonic sensor 100F according to the seventh preferred embodiment differs from the ultrasonic sensor 100A according to the first preferred embodiment in that the ultrasonic sensor 100F has a plurality of operation modes having different detection distances. The ultrasonic sensor 100F sequentially switches between the plurality of operation modes having different detection distances and controls the piezoelectric element 200 (refer to FIG. 1) using control conditions corresponding to the current operation mode. Thus, the range of distances able to be detected is increased. Furthermore, the ultrasonic sensor 100F detects an object in any location. It is sufficient that the ultrasonic sensor 100F have at least two operation modes.

The hardware configuration and so forth of the ultrasonic sensor 100F according to the seventh preferred embodiment is the same as that of the ultrasonic sensor 100 according to the first preferred embodiment and therefore description thereof will not be repeated hereafter.

Figure 26:
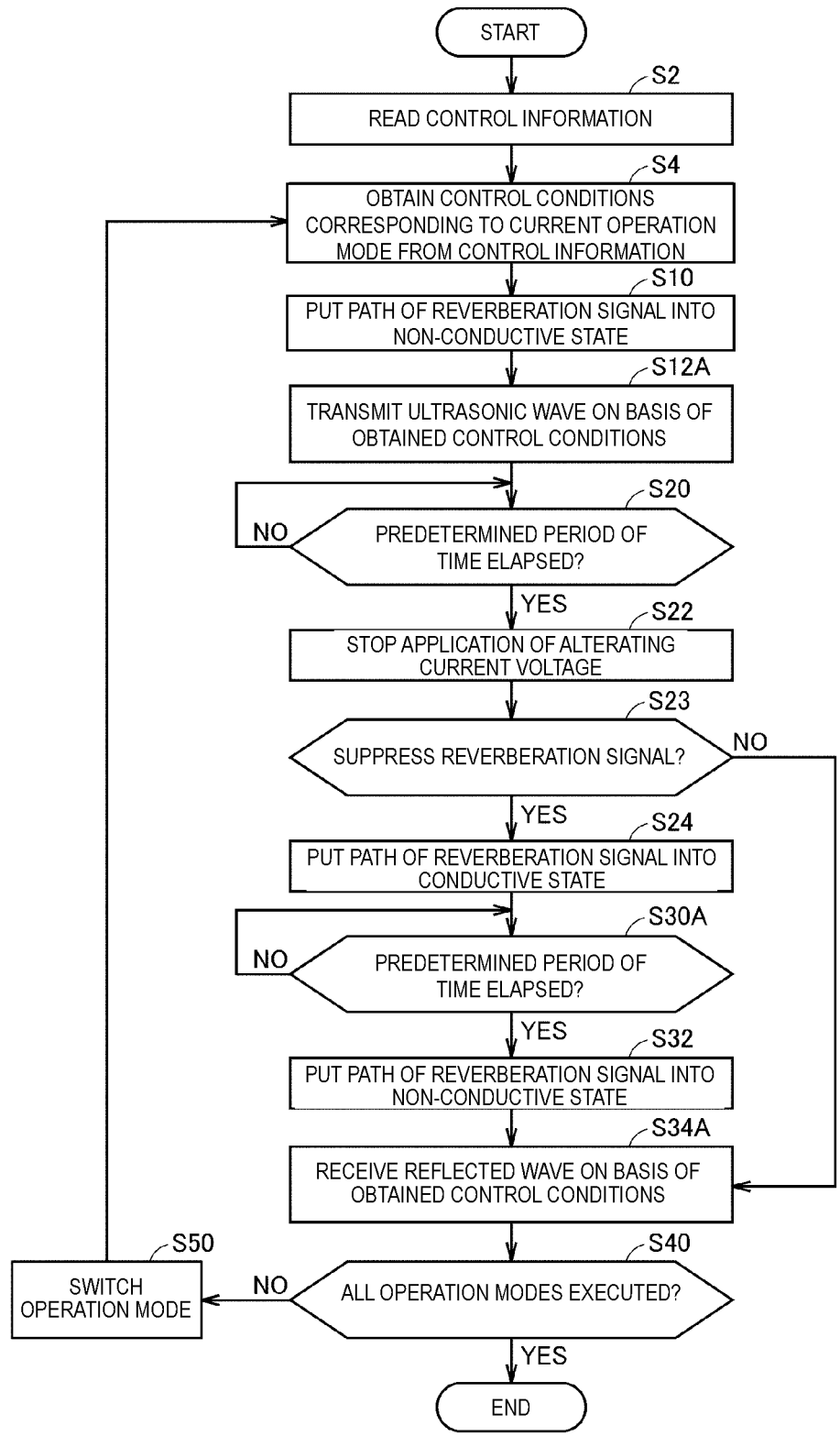
FIG. 26 is a flowchart that depicts processing executed by an ultrasonic sensor according to a seventh preferred embodiment of the present invention.

The ultrasonic sensor 100F according to the seventh preferred embodiment will be described while referring to FIGS. 26 and 27. FIG. 26 is a flowchart that depicts processing executed by the ultrasonic sensor 100F according to the seventh preferred embodiment. The processing in FIG. 26 preferably is realized by a program being executed by the control circuit 101 (refer to FIG. 1), which controls the ultrasonic sensor 100F. In another aspect of a preferred embodiment of the present invention, some or all of the processing may be executed by a CPU or other hardware such as circuitry or IC circuit(s).

In step S2, the control circuit 101 reads control information 124 illustrated in FIG. 27. FIG. 27 illustrates the content of the control information 124. The control information 124 is stored in advance in a storage region of the control circuit 101, for example. As illustrated in FIG. 27, control conditions of the piezoelectric element 200 (refer to FIG. 1) are assigned in accordance with detection distances of the ultrasonic sensor 100F for the operation modes of the ultrasonic sensor 100F.

In step S4, the control circuit 101 obtains control conditions corresponding to the current operation mode of the ultrasonic sensor 100F from the control information 124.

In step S10, the control circuit 101 puts the path 109 (refer to FIG. 2) into the non-conductive state by driving the semiconductor element 107 (refer to FIG. 2).

In step S12A, the control circuit 101 applies an alternating-current voltage to the transmission region 50A of the piezoelectric element 200 (refer to FIG. 1) on the basis of the control conditions obtained in step S4. More specifically, a driving voltage of the piezoelectric element 200 and a driving frequency of the piezoelectric element 200 are stipulated in the control conditions obtained in step S4 and the control circuit 101 drives the piezoelectric element 200 at the driving voltage and the driving frequency. Thus, an ultrasonic wave is caused to be transmitted from the transmission region 50A of the piezoelectric element 200.

In step S20, the control circuit 101 determines whether a predetermined period of time (for example, several microseconds to several milliseconds) has elapsed since the alternating-current voltage was applied to the transmission region 50A. In the case where the control circuit 101 determines that the predetermined period of time has elapsed since the alternating-current voltage was applied to the transmission region 50A (YES in step S20), the control circuit 101 switches the control to step S22. In the case where the determination is negative (NO in step S20), the control circuit 101 re-executes the processing of step S20.

In step S22, the control circuit 101 stops application of the alternating-current voltage to the transmission region 50A of the piezoelectric element 200.

In step S23, the control circuit 101 determines whether to significantly reduce or prevent the reverberant vibration on the basis of the control conditions obtained in step S4. More specifically, a suppression mode indicating whether to enable suppression of the reverberant vibration is stipulated in the control conditions obtained in step S4. In the case where the suppression mode stipulated in the control conditions obtained in step S4 is ON, the control circuit 101 determines to significantly reduce or prevent the reverberant vibration. In the case where the suppression mode in the control conditions obtained in step S4 is OFF, the control circuit 101 determines not to significantly reduce or prevent the reverberant vibration. The control circuit 101 switches the control to step S24 in the case where the control circuit 101 determines to significantly reduce or prevent the reverberant vibration (YES in step S23). The control circuit 101 switches the control to step S34A in the case where the determination is negative (NO in step S23).

In step S24, the control circuit 101 switches the path 109 from the non-conductive state to the conductive state by driving the semiconductor element 107. Thus, the reverberation signal output in accordance with the reverberant vibration is fed back to the transmission electrode 10 (refer to FIG. 2) from the reception region 50B (refer to FIG. 2) of the piezoelectric element 200. As a result, the reverberant vibration of the ultrasonic sensor 100F is significantly reduced or prevented.

In step S30A, the control circuit 101 determines whether a predetermined period of time had elapsed since the path 109 was put into the conductive state. The predetermined period of time is stipulated in the control conditions obtained in step S4. That is, the control circuit 101 puts the path 109 into the conductive state for a period of time stipulated in the control conditions obtained in step S4. In the case where the control circuit 101 determines that the predetermined period of time has elapsed since the path 109 was put into the conductive state (YES in step S30A), the control circuit 101 switches the control to step S32. In the case where the determination is negative (NO in step S30A), the control circuit 101 re-executes the processing of step S30A.

In step S32, the control circuit 101 switches the path 109 from the conductive state to the non-conductive state by driving the semiconductor element 107.

In step S34A, the control circuit 101 controls the reception region 50B of the piezoelectric element 200 on the basis of the control conditions obtained in step S4. A waiting time from transmission of the ultrasonic wave until reception of the reflected wave and gain of the reception signal output in response to reception of the reflected wave are stipulated in the control conditions obtained in step S4. The control circuit 101 outputs a reflected wave received in the period from transmission of the ultrasonic wave until the waiting time elapses to the reception circuit 110 (refer to FIG. 1) as a voltage value that corresponds to the gain. The control circuit 101 switches the control to step S40 in response to the waiting time from transmission of the ultrasonic wave elapsing.

In step S40, the control circuit 101 determines whether control processing according to this preferred embodiment has been executed for all the operation modes of the ultrasonic sensor 100F. In the case where the control circuit 101 determines that the control processing according to this preferred embodiment has been executed for all the operation modes of the ultrasonic sensor 100F (YES in step S40), the control circuit 101 ends the control processing according to this preferred embodiment. The control circuit 101 switches the control to step S50 in the case where the determination is negative (NO in step S40).

In step S50, the control circuit 101 switches the operation mode of the ultrasonic sensor 100F from the current operation mode to another operation mode. Through the processing of steps S40 and S50, the processing illustrated in FIG. 26 is repeated a number of times equal to the number of operation modes of the ultrasonic sensor 100F.

As described above, the ultrasonic sensor 100F sequentially switches between the plurality of operation modes having different detection distances and controls the piezoelectric element 200 using the control conditions corresponding to the current operation mode. Thus, the range of distances able to be detected is increased. Furthermore, the ultrasonic sensor 100F detects an object in any location.

Eighth Preferred Embodiment

An overview of an ultrasonic sensor 100G according to an eighth preferred embodiment of the present invention will be described. The ultrasonic sensor 100G according to the eighth preferred embodiment differs from the ultrasonic sensor 100F according to the seventh preferred embodiment in that the ultrasonic sensor 100G has at least an operation mode that detects a short distance (first operation mode) (hereafter, also referred to as "short-distance mode") and an operation mode that detects a long distance (second operation mode) (hereafter, also referred to as "long-distance mode").

A reverberant vibration naturally subsides in the case where an object that is a target of detection is far from the ultrasonic sensor 100G. Therefore, it is not necessary to significantly reduce or prevent the reverberant vibration in the case where an object that is a target of detection is far from the ultrasonic sensor 100G. Focusing on this point, the ultrasonic sensor 100G does not execute processing to significantly reduce or prevent the reverberation signal in the case where the operation mode is the long-distance mode. In other words, the processing to significantly reduce or prevent the reverberation signal is stopped in this case. Thus, power consumption of the ultrasonic sensor 100G is significantly reduced or prevented.

Other details such as the hardware configuration and so forth are the same as described above and therefore, description thereof will not be repeated.

Figure 28:
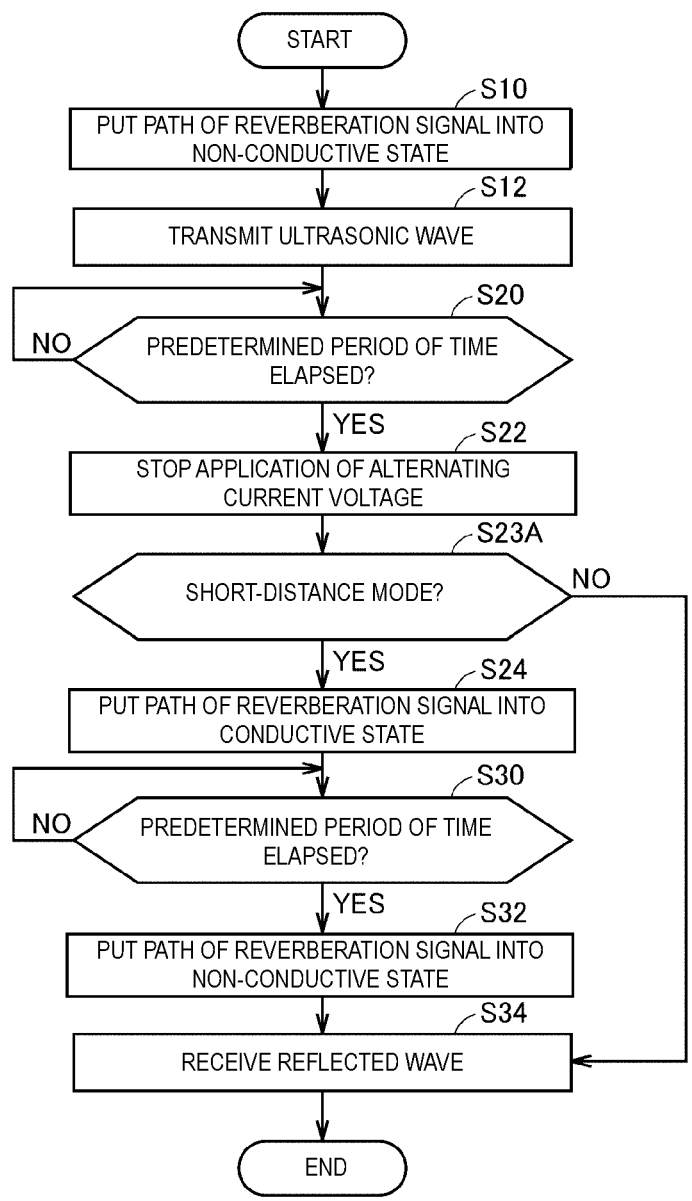
FIG. 28 is a flowchart that depicts processing executed by an ultrasonic sensor according to an eighth preferred embodiment of the present invention.

The ultrasonic sensor 100G according to the eighth preferred embodiment will be described while referring to FIG. 28. FIG. 28 is a flowchart that depicts processing executed by the ultrasonic sensor 100G according to the eighth preferred embodiment. The processing in FIG. 28 is realized by a program being executed by the control circuit 101 (refer to FIG. 1), which controls the ultrasonic sensor 100G. In another aspect of a preferred embodiment of the present invention, some or all of the processing may be executed by a CPU or other hardware such as circuitry or IC circuit(s).

Since the processing of steps other than step S23A is the same as that described in FIG. 3, description thereof will not be repeated hereafter.

In step S23A, the control circuit 101 determines whether the operation mode of the ultrasonic sensor 100G is the short-distance mode. The operation mode of the ultrasonic sensor 100G is arbitrarily set by a user, for example. In the case where the control circuit 101 determines that the operation mode of the ultrasonic sensor 100G is the short-distance mode (YES in step S23A), the control circuit 101 switches the control to step S24. The control circuit 101 switches the control to step S34 in the case where the determination is negative (NO in step S23A).

Through the processing of step S23A, the control circuit 101 executes the processing of steps S24 to S32, which significantly reduces or prevents the reverberant vibration, in the case where the operation mode of the ultrasonic sensor 100G is the short-distance mode. In other words, in this case, the control circuit 101 executes processing to feed the reverberation signal back to the transmission electrode 10 of the piezoelectric element 200 (refer to FIG. 1). In the case where the operation mode of the ultrasonic sensor 100G is the long-distance mode, the control circuit 101 does not execute the processing of steps S24 to S32 to significantly reduce or prevent the reverberant vibration. In other words, in this case, the control circuit 101 stops the processing of feeding the reverberation signal back to the transmission electrode 10 of the piezoelectric element 200.

As described above, the ultrasonic sensor 100G according to this preferred embodiment does not execute the processing to significantly reduce or prevent the reverberant vibration in the case where the operation mode is the long-distance mode. Thus, power consumption of the ultrasonic sensor 100G is significantly reduced or prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An ultrasonic sensor comprising:
a piezoelectric element including:
a flat plate-shaped piezoelectric body that includes a transmission region that transmits an ultrasonic wave in response to an alternating current voltage being applied thereto and a reception region that receives a reflected wave of the ultrasonic wave;
a common electrode that is provided in the transmission region and the reception region;
a transmission electrode that faces the common electrode with the transmission region interposed therebetween and that is provided in the transmission region; and
a reception electrode that faces the common electrode with the reception region interposed therebetween and that is provided in the reception region; and
a semiconductor element that is electrically connected to the transmission electrode and the reception electrode and switches an electrical path extending between the transmission electrode and the reception electrode between a conductive state and a non-conductive state; wherein
the semiconductor element puts the electrical path into the conductive state after application of the alternating current voltage is stopped, and as a result, a reverberation signal output from the reception region in accordance with a reverberant vibration of the ultrasonic wave is fed back to the transmission electrode.
2. The ultrasonic sensor according to claim 1, wherein the semiconductor element switches the electrical path from the conductive state to the non-conductive state after the reverberation signal has been fed back to the transmission electrode.
3. The ultrasonic sensor according to claim 1, further comprising:
an amplifier that is connected in series with the semiconductor element along the electrical path; wherein
the amplifier amplifies the reverberation signal and outputs the amplified reverberation signal to the transmission electrode.

4. The ultrasonic sensor according to claim 3, further comprising:
an I/V conversion circuit that converts a current into a voltage; wherein
the I/V conversion circuit is provided along the electrical path.
5. The ultrasonic sensor according to claim 4, wherein the I/V conversion circuit filters a signal of a frequency band that causes the ultrasonic sensor to undergo abnormal oscillation.
6. The ultrasonic sensor according to claim 4, wherein the I/V conversion circuit includes:
an operational amplifier; and
a capacitor; wherein
an inverting input terminal of the operational amplifier is electrically connected to the reception electrode;
an output terminal of the operational amplifier is electrically connected to the amplifier; and
the capacitor is electrically connected to the inverting input terminal and the output terminal.
7. The ultrasonic sensor according to claim 4, further comprising a reception circuit that is electrically connected to the I/V conversion circuit.
8. The ultrasonic sensor according to claim 3, wherein the amplifier is an inverter amplification circuit including a resistor and an operational amplifier.
9. The ultrasonic sensor according to claim 1, further comprising a step up transformer that is provided along the electrical path.
10. The ultrasonic sensor according to claim 1, wherein
the ultrasonic sensor includes a plurality of operation modes having different detection distances from each other;
control conditions of the piezoelectric element are associated in advance with the plurality of operation modes in accordance with the detection distances; and
the ultrasonic sensor sequentially switches between the plurality of operation modes and controls the piezoelectric element using the control conditions corresponding to a current operation mode.
11. The ultrasonic sensor according to claim 1, wherein the ultrasonic sensor includes:
a first operation mode; and
a second operation mode that has a longer detection distance than the first operation mode; and
the ultrasonic sensor executes:
processing to feed the reverberation signal back to the transmission electrode in the first operation mode; and
does not execute processing to feed the reverberation signal back to the transmission electrode in the second operation mode.
12. The ultrasonic sensor according to claim 1, further comprising a control circuit that controls the semiconductor element.
13. The ultrasonic sensor according to claim 12, further comprising a signal generating circuit that generates the alternating current voltage based on a control signal provided by the control circuit.
14. The ultrasonic sensor according to claim 1, wherein the semiconductor element includes a transistor.
15. The ultrasonic sensor according to claim 1, wherein the ultrasonic sensor includes three terminals or four or more terminals.
16. The ultrasonic sensor according to claim 1, wherein the reception electrode detects the reverberant vibration.
17. The ultrasonic sensor according to claim 1, wherein the reception region does not include a semiconductor element.

18. A control method for an ultrasonic sensor, the ultrasonic sensor including a piezoelectric element, the piezoelectric element including a flat plate-shaped piezoelectric body that includes a transmission region that transmits an ultrasonic wave in response to an alternating current voltage being applied thereto and a reception region that receives a reflected wave of the ultrasonic wave, a common electrode that is provided in the transmission region and the reception region, a transmission electrode that faces the common electrode with the transmission region interposed therebetween and that is provided in the transmission region, and a reception electrode that faces the common electrode with the reception region interposed therebetween and is provided in the reception region, the ultrasonic sensor further including a semiconductor element that is electrically connected to the transmission electrode and the reception electrode and switches an electrical path extending between the transmission electrode and the reception electrode between a conductive state and a non-conductive state, the control method comprising:

putting the electrical path into the non-conductive state;

applying an alternating current voltage to the transmission region after the electrical path has been put into the non-conductive state; and feeding a reverberation signal, which is output from the reception region in accordance with a reverberant vibration of the ultrasonic wave, back to the transmission electrode by putting the electrical path into the conductive state after stopping application of the alternating current voltage.

19. The control method according to claim 18, wherein the ultrasonic sensor includes a plurality of operation modes having different detection distances from each other;

control conditions of the piezoelectric element are associated in advance with the plurality of operation modes in accordance with the detection distances; and the control method further comprises sequentially switching between the plurality of operation modes and controlling the piezoelectric element using the control conditions corresponding to a current operation mode.

20. The control method according to claim 18, wherein the ultrasonic sensor includes:

a first operation mode; and a second operation mode that has a longer detection distance than the first operation mode; and the control method further comprises:

executing processing to feed the reverberation signal back to the transmission electrode in the first operation mode; and stopping processing to feed the reverberation signal back to the transmission electrode in the second operation mode.

* * * * *